United States Patent
Huang et al.

(10) Patent No.: US 11,765,765 B2
(45) Date of Patent: Sep. 19, 2023

(54) MULTIPLEXING TECHNIQUES FOR MULTIPLE UPLINK COMPONENT CARRIERS

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/353,061

(22) Filed: Jun. 21, 2021

(65) Prior Publication Data

US 2022/0353873 A1    Nov. 3, 2022

Related U.S. Application Data

(60) Provisional application No. 63/182,298, filed on Apr. 30, 2021.

(51) Int. Cl.
*H04W 72/10*     (2009.01)
*H04L 1/18*     (2023.01)
(Continued)

(52) U.S. Cl.
CPC ........... *H04W 72/56* (2023.01); *H04L 1/1896* (2013.01); *H04W 72/0446* (2013.01);
(Continued)

(58) Field of Classification Search
CPC .... H04L 1/1869; H04L 5/00; H04W 72/0446; H04W 72/56; H04W 72/21; H04W 72/1263; H04W 72/0453
See application file for complete search history.

(56) References Cited

U.S. PATENT DOCUMENTS

| | | | |
|---|---|---|---|
| 9,258,092 B2 * | 2/2016 | Heo | .................... H04W 52/367 |
| 2021/0045143 A1 | 2/2021 | Ji et al. | |

(Continued)

FOREIGN PATENT DOCUMENTS

EP     3793303 A1     3/2021

OTHER PUBLICATIONS

International Search Report and Written Opinion—PCT/US2022/026911—ISA/EPO—dated Sep. 20, 2022 (2104642WO).

*Primary Examiner* — Brian D Nguyen
(74) *Attorney, Agent, or Firm* — Holland & Hart LLP

(57) ABSTRACT

Methods, systems, and devices for wireless communications are described that provide multiplexing of one or more control or shared channel communications on one or more uplink component carriers (CCs). Uplink control channel communications may be multiplexed within each CC that is configured for uplink control channel transmissions and, after multiplexing the control channel communications within each CC, multiplexing with shared channel communications may be performed. Multiplexed or un-multiplexed control channel communications may be multiplexed with a shared channel communication on a same or a different CC, where the multiplexing on the same CC or on the different CC is based at least in part on a configuration associated with concurrent shared channel and control channel communications. Further a priority associated with one or more of the shared channel communications or the control channel communications may be used to determine channels to multiplex together on a CC.

30 Claims, 21 Drawing Sheets

(51) Int. Cl.
      *H04W 72/04*       (2023.01)
      *H04W 72/12*       (2023.01)
      *H04W 72/56*       (2023.01)
      *H04W 72/1263*       (2023.01)
      *H04W 72/0453*       (2023.01)
      *H04L 1/1867*       (2023.01)
      *H04W 72/0446*       (2023.01)
      *H04W 72/21*       (2023.01)

(52) U.S. Cl.
      CPC ... *H04W 72/0453* (2013.01); *H04W 72/1263* (2013.01); *H04W 72/21* (2023.01)

(56) References Cited

U.S. PATENT DOCUMENTS

| | | | |
|---|---|---|---|
| 2022/0158794 A1* | 5/2022 | Zhang | H04L 5/0055 |
| 2022/0394707 A1* | 12/2022 | Chen | H04L 1/0027 |
| 2022/0399960 A1* | 12/2022 | Bae | H04W 72/23 |
| 2022/0407657 A1* | 12/2022 | Gao | H04L 5/0094 |
| 2022/0416870 A1* | 12/2022 | Ling | H04B 7/0695 |
| 2023/0006776 A1* | 1/2023 | Yang | H04W 72/21 |
| 2023/0006798 A1* | 1/2023 | Lee | H04W 72/21 |
| 2023/0007648 A1* | 1/2023 | Li | H04W 72/21 |
| 2023/0007663 A1* | 1/2023 | Wu | H04W 72/56 |

\* cited by examiner

MULTIPLEXING TECHNIQUES FOR MULTIPLE UPLINK COMPONENT CARRIERS

CROSS REFERENCE

The present Application for Patent claims the benefit of U.S. Provisional Patent Application No. 63/182,298 by HUANG et al., entitled "MULTIPLEXING TECHNIQUES FOR MULTIPLE UPLINK COMPONENT CARRIERS," filed Apr. 30, 2021, assigned to the assignee hereof, and expressly incorporated by reference herein.

FIELD OF TECHNOLOGY

The following relates to wireless communications, including multiplexing techniques for multiple uplink component carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, UEs and base stations may use multiple component carriers for communications, in which each component carrier may carry uplink communications from a UE to a base station, downlink communications from a base station to a UE, or combinations thereof. Such techniques may enhance an amount of data that may be transferred between the UE and base station and reduce latency for communications. Techniques for further enhancement of communications using multiple component carriers may help to further increase data rates and reduce latency for communications.

SUMMARY

The described techniques relate to improved methods, systems, devices, and apparatuses that support multiplexing techniques for multiple uplink component carriers. In various aspects, described techniques provide for multiplexing uplink control channel transmissions, uplink shared channel transmissions, or combinations thereof, on multiple configured uplink component carriers (CCs). In some cases, uplink control channel communications (e.g. physical uplink control channel (PUCCH) communications) may be transmitted on a primary component carrier (PCC) or a secondary component carrier (SCC), and uplink shared channel communications may be transmitted on any configured uplink component carrier. In some cases, uplink control channel communications may be multiplexed within each configured CC. In some cases, after multiplexing the control channel communications within each CC, the multiplexed or un-multiplexed (depending on whether the associated CC had multiple overlapping control channel communications) control channel communications may be multiplexed with a shared channel communication on a same or a different CC, where the multiplexing on the same CC or on the different CC is based at least in part on a configuration associated with concurrent shared channel and control channel communications.

A method for wireless communication at a user equipment (UE) is described. The method may include receiving, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier, multiplexing, for each of the first component carrier and the second component carrier, two or more control channel communications on the associated component carrier that are overlapping in the time domain, multiplexing, after multiplexing the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications, and transmitting multiplexed control information and uplink shared channel communications based on the second multiplexing procedure.

An apparatus for wireless communication at a UE is described. The apparatus may include a processor and memory coupled with the processor, the processor and memory configured to receive, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier, multiplexing, for each of the first component carrier and the second component carrier, two or more control channel communications on the associated component carrier that be overlapping in the time domain, multiplexing, after multiplex the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications, and transmit multiplexed control information and uplink shared channel communications based on the second multiplexing procedure.

Another apparatus for wireless communication at a UE is described. The apparatus may include means for receiving, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier, means for multiplexing, for each of the first component carrier and the second component carrier, two or more control channel communications on the associated component carrier that are overlapping in the time domain, means for multiplexing, after multiplexing the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications, and means for transmitting multiplexed control information and uplink shared channel communications based on the second multiplexing procedure.

A non-transitory computer-readable medium storing code for wireless communication at a UE is described. The code may include instructions executable by a processor to receive, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier, multiplexing, for each of the first component carrier and the second component carrier, two or more control channel communications on the associated component carrier that be overlapping in the time domain, multiplexing, after multiplex the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications, and transmit multiplexed control information and uplink shared channel communications based on the second multiplexing procedure.

In some examples of the method, apparatuses, and non-transitory computer-readable medium described herein, the multiplexing the two or more control channel communications for each component carrier may include operations, features, means, or instructions for multiplexing any control channel communications of a same component carrier that are overlapping in the time domain, and where any control channel communications of any component carrier that are non-overlapping with any other control channel communications of that component carrier are not multiplexed together.

In some examples of the method, apparatuses, and non-transitory computer-readable medium described herein, the multiplexing the control channel communications with the uplink shared channel communications may include operations, features, means, or instructions for determining that a first control channel communication and a second control channel communication associated with the first component carrier are multiplexed in a first multiplexed control channel communication associated with the first component carrier, determining that a third control channel communication associated with the second component carrier is overlapping in the time domain with a first uplink shared channel communication on the different component carrier, and multiplexing the third control channel communication and the first uplink shared channel communication for transmission on the different component carrier, and where the first multiplexed control channel communication is transmitted on the first component carrier when the first multiplexed control channel communication is not overlapping with the first uplink shared channel communication for transmission on the different component carrier.

In some examples of the method, apparatuses, and non-transitory computer-readable medium described herein, the third control channel communication associated with the second component carrier is treated as non-overlapping with both the first control channel communication and the second control channel communication irrespective of whether either of the first control channel communication or the second control channel communication are overlapping with the third control channel communication in the time domain.

In some examples of the method, apparatuses, and non-transitory computer-readable medium described herein, the control channel communications include channel state information, scheduling request information, acknowledgment/negative-acknowledgment feedback, or any combinations thereof.

In some examples of the method, apparatuses, and non-transitory computer-readable medium described herein, the multiplexing the control channel communications with the uplink shared channel communications is performed on a per-component carrier basis to multiplex the control channel communications and the uplink shared channel communications on a same component carrier, and where the transmitting includes transmitting uplink communications concurrently on two or more component carriers of the set of multiple uplink component carriers.

In some examples of the method, apparatuses, and non-transitory computer-readable medium described herein, the multiplexing the control channel communications with the uplink shared channel communications procedure is performed across component carriers to multiplex control channel communications of one or more of the first component carrier or the second component carrier with the uplink shared channel communications of the different component carrier based on the different component carrier being configured for control channel communications.

In some examples of the method, apparatuses, and non-transitory computer-readable medium described herein, a first subset of the set of multiple uplink component carriers are configured to allow control channel communications or shared channel communications, and a second subset of the set of multiple uplink component carriers are configured to allow uplink shared channel communications only, and where the multiplexing the control channel communications with the uplink shared channel communications is performed across component carriers only for the first subset of the set of multiple uplink component carriers. In some examples of the method, apparatuses, and non-transitory computer-readable medium described herein, the multiplexing the two or more control channel communications for each component carrier is based on a priority associated with each of the two or more control channel communications on the associated component carrier.

In some examples of the method, apparatuses, and non-transitory computer-readable medium described herein, the multiplexing the control channel communications with the uplink shared channel communications is based on a first priority associated with the control channel communications from one or more of the first component carrier or the second component carrier and a second priority associated with the uplink shared channel communications.

In some examples of the method, apparatuses, and non-transitory computer-readable medium described herein, the multiplexing the control channel communications with the uplink shared channel communications is performed on across component carriers to multiplex control channel communications of one or more of the first component carrier or the second component carrier with the uplink shared channel communications of the different component carrier based on the different component carrier being configured to allow control channel communications and further based on a priority associated with the control channel communications and the uplink shared channel communications. In some examples of the method, apparatuses, and non-transitory computer-readable medium described herein, two or more control channel communications having different priorities are multiplexed together for transmission.

A method for wireless communication at a base station is described. The method may include transmitting, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier, receiving uplink communications from the UE on one or more of the set of multiple uplink component carriers, demultiplexing, for each of the first component carrier and the second component carrier, two or more control channel communications on the associated component carrier that are overlapping in the time domain, and demultiplexing the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications.

An apparatus for wireless communication at a base station is described. The apparatus may include a processor and memory coupled with the processor, the processor and memory configured to transmit, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier, receive uplink communications from the UE on one or more of the set of multiple uplink component carriers, demultiplex, for each of the first component carrier and the second component carrier, two or more control channel communications on the associated component carrier that are overlapping in the time domain, and demultiplex the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications.

Another apparatus for wireless communication at a base station is described. The apparatus may include means for transmitting, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier, means for receiving uplink communications from the UE on one or more of the set of multiple uplink component carriers, means for demultiplexing, for each of the first component carrier and the second component carrier, two or more control channel communications on the associated component carrier that are overlapping in the time domain, and means for demultiplexing the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications.

A non-transitory computer-readable medium storing code for wireless communication at a base station is described. The code may include instructions executable by a processor to transmit, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier, receive uplink communications from the UE on one or more of the set of multiple uplink component carriers, demultiplex, for each of the first component carrier and the second component carrier, two or more control channel communications on the associated component carrier that are overlapping in the time domain, and demultiplex the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications.

In some examples of the method, apparatuses, and non-transitory computer-readable medium described herein, the demultiplexing the two or more control channel communications may include operations, features, means, or instructions for demultiplexing any control channel communications of a same component carrier that are overlapping in the time domain, and where any control channel communications of any component carrier that are non-overlapping with any other control channel communications of that component carrier are not multiplexed together.

Some examples of the method, apparatuses, and non-transitory computer-readable medium described herein may further include operations, features, means, or instructions for demultiplexing a first control channel communication and a second control channel communication associated with the first component carrier in a first multiplexed control channel communication associated with the first component carrier, and where and the demultiplexing the control channel communications and uplink shared channel communications is performed on an uplink communication on the different component carrier to demultiplex a third control channel communication associated with the second component carrier that is overlapping in the time domain with a first uplink shared channel communication on the different component carrier when the first multiplexed control channel communication is not overlapping with the first uplink shared channel communication for transmission.

In some examples of the method, apparatuses, and non-transitory computer-readable medium described herein, the third control channel communication associated with the second component carrier is treated as non-overlapping with both the first control channel communication and the second control channel communication irrespective of whether either of the first control channel communication or the second control channel communication is overlapping with the third control channel communication in the time domain. In some examples of the method, apparatuses, and non-transitory computer-readable medium described herein, the control channel communications include channel state information, scheduling request information, acknowledgment/negative-acknowledgment feedback, or any combinations thereof.

In some examples of the method, apparatuses, and non-transitory computer-readable medium described herein, the demultiplexing the control channel communications and uplink shared channel communications is performed on a per-component carrier basis to demultiplex the control channel communications and the uplink shared channel communications on a same component carrier, and where the receiving includes receiving the uplink communications concurrently on two or more component carriers of the set of multiple uplink component carriers.

In some examples of the method, apparatuses, and non-transitory computer-readable medium described herein, the demultiplexing the control channel communications and uplink shared channel communications is performed across component carriers to demultiplex control channel communications of one or more of the first component carrier or the second component carrier and the uplink shared channel communications of the different component carrier based on the different component carrier being configured to allow control channel communications, and where the receiving includes receiving the uplink communications concurrently on the different component carrier and one or more of the first component carrier or the second component carrier. In some examples of the method, apparatuses, and non-transitory computer-readable medium described herein, a first subset of the set of multiple uplink component carriers are configured to allow control channel communications or shared channel communications and a second subset of the set of multiple uplink component carriers are configured to allow uplink shared channel communications only.

In some examples of the method, apparatuses, and non-transitory computer-readable medium described herein, the demultiplexing the two or more control channel communications is based on a priority associated with each of the two or more control channel communications on the associated component carrier. In some examples of the method, apparatuses, and non-transitory computer-readable medium described herein, the demultiplexing the control channel communications and uplink shared channel communications is based on a first priority associated with the control channel communications from one or more of the first component carrier or the second component carrier and a second priority associated with the uplink shared channel communications.

In some examples of the method, apparatuses, and non-transitory computer-readable medium described herein, the demultiplexing the control channel communications and uplink shared channel communications is performed across component carriers to demultiplex control channel communications of one or more of the first component carrier or the second component carrier with the uplink shared channel communications of the different component carrier based on the different component carrier being configured to allow control channel communications and further based on a priority associated with the control channel communications and the uplink shared channel communications. In some examples of the method, apparatuses, and non-transitory computer-readable medium described herein, two or more control channel communications having different priorities are multiplexed together at the UE for transmission.

DETAILED DESCRIPTION

Figure 1:
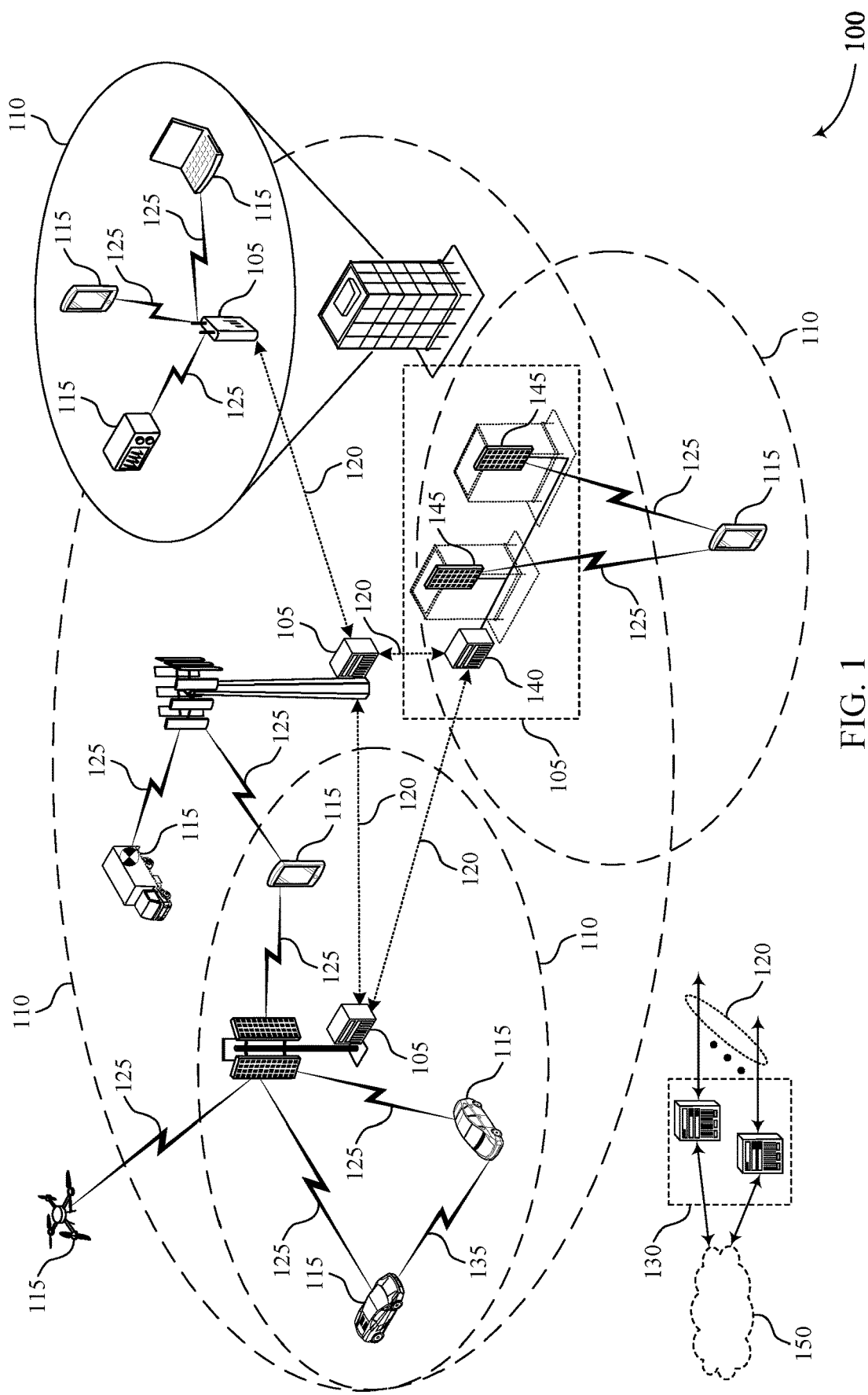
FIG. 1 illustrates an example of a wireless communications system that supports multiplexing techniques for multiple uplink component carriers in accordance with aspects of the present disclosure.

Some wireless communication systems may include communication devices, such as user equipment and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may, in some examples, support one or more of the above example radio access technologies. A user equipment (UE) may communicate with a base station in a wireless communications system. The base station may transmit downlink communications to the UE, and the UE may transmit uplink communications to the base station. The downlink and uplink transmissions may include data and control transmissions. For example, the UE may transmit uplink control information in a physical uplink control channel (PUCCH) transmission and may transmit uplink data in a physical uplink shared channel (PUSCH) transmission. Further, in some cases, communications between the base station and UE may use carrier aggregation (CA) techniques, in which multiple component carriers (CCs) may be configured to carry downlink communications, uplink communications, or both.

In some deployments, uplink CA may be configured to allow for PUCCH transmissions only on a primary component carrier (PCC), which in some cases may be referred to as a primary cell (PCell), or on both the PCC and one or more secondary component carriers (SCCs or SCells). Further, uplink CA may be configured to provide for multiplexing of control channel communications with shared channel communication on one or multiple CCs. In various aspects as discussed herein, multiplexing techniques for uplink CA are provided, and a UE may use such techniques to multiplex control channel and shared channel communications within and/or across CCs.

In some cases, uplink control channel communications may be multiplexed within each CC that is configured for uplink control channel transmissions. After multiplexing the control channel communications within each CC, multiplexing with shared channel communications may be performed. For example, multiplexed or un-multiplexed control channel communications, depending on whether the associated CC had multiple overlapping control channel communications that were multiplexed together, may be multiplexed with a shared channel communication on a same or a different CC, where the multiplexing on the same CC or on the different CC is based at least in part on a configuration associated with concurrent shared channel and control channel communications. Further, in some cases, a priority associated with one or more of the shared channel communications or the control channel communications may be used to determine whether channels should be multiplexed together on a CC.

Techniques such as discussed herein may allow for efficient and reliable communications using uplink carrier aggregation, and may also provide for reduced power consumption and more efficient usage of uplink resources based on multiplexing one or more control channel communications, one or more shared channel communications, or any combinations thereof.

Aspects of the disclosure are initially described in the context of wireless communications systems. Examples of carrier aggregation multiplexing techniques for different channels on different CCs are then discussed. Aspects of the disclosure are further illustrated by and described with reference to apparatus diagrams, system diagrams, and flowcharts that relate to multiplexing techniques for multiple uplink component carriers.

FIG. 1 illustrates an example of a wireless communications system 100 that supports multiplexing techniques for multiple uplink component carriers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, uplink carrier aggregation may be used for communications between one or more UEs 115 and associated serving base stations 105. Further, in some cases, multiplexing techniques such as discussed herein may be used to multiplex one or more control or shared channel communications on one or more CCs. In some cases, uplink control channel communications may be multiplexed within each CC that is configured for uplink control channel transmissions. After multiplexing the control channel communications within each CC, multiplexing with shared channel communications may be performed. For example, multiplexed or un-multiplexed control channel communications may be multiplexed with a shared channel communication on a same or a different CC, where the multiplexing on the same CC or on the different CC is based at least in part on a configuration associated with concurrent shared channel and control channel communications. Further, in some cases, a priority associated with one or more of the shared channel communications or the control channel communications may be used to determine whether channels should be multiplexed together on a CC.

Figure 2:
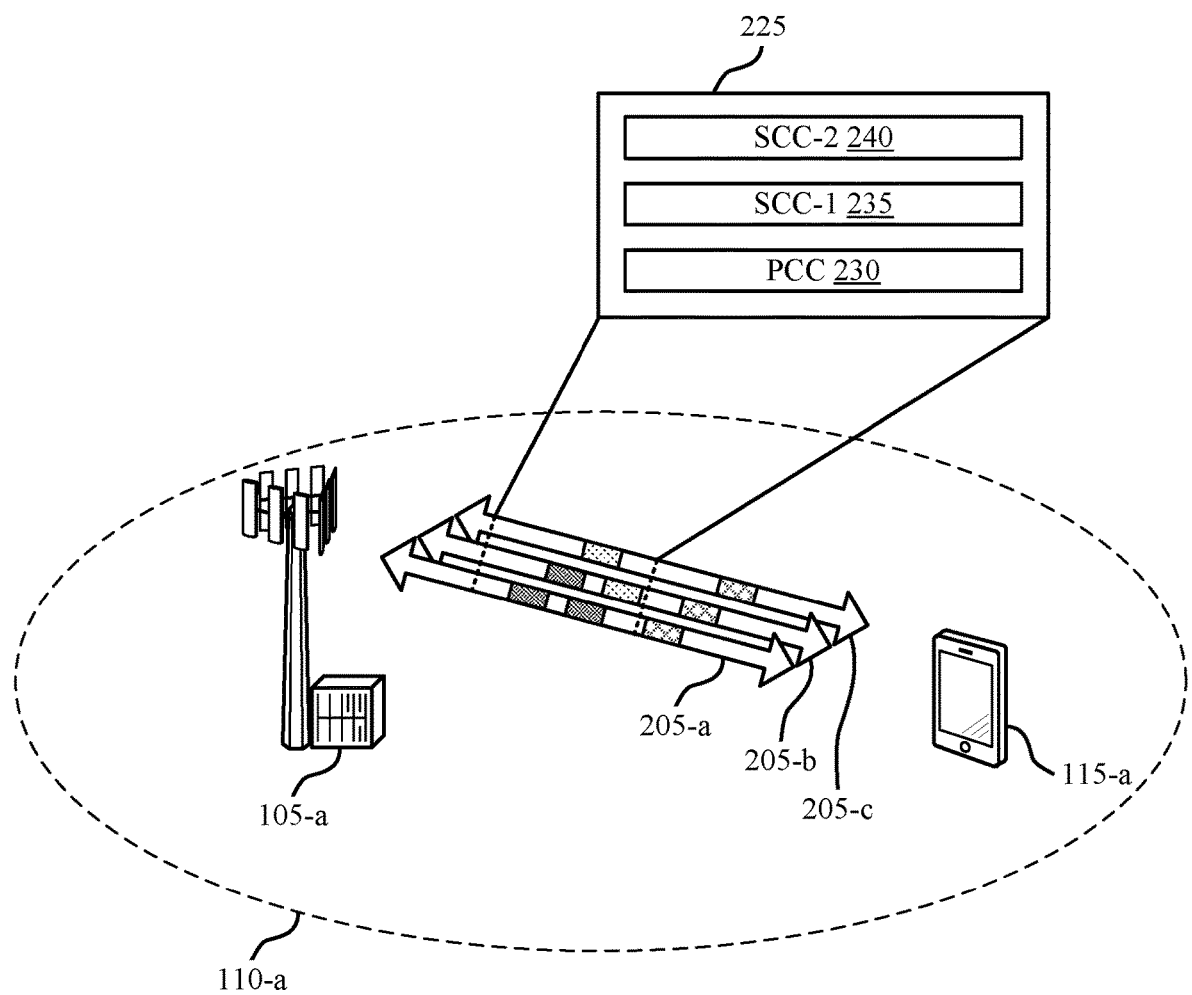
FIG. 2 illustrates an example of a portion of a wireless communications system that supports multiplexing techniques for multiple uplink component carriers in accordance with aspects of the present disclosure.

FIG. 2 illustrates an example of a wireless communications system 200 that supports multiplexing techniques for multiple uplink component carriers in accordance with aspects of the present disclosure. In some examples, the wireless communications system 200 may implement aspects of wireless communications system 100. Wireless communications system 200 may include UE 115-a that may be an example of a UE 115 as described with respect to FIG. 1, and base station 105-*a* that may be an example of a base station 105 as described with respect to FIG. 1. The base station 105-*a* may serve one or more UEs 115, including UE 115-*a*, within coverage area 110-*a*. The base station 105-*a* and UE 115-*a* in this example may exchange uplink and downlink communications using multiple CCs 205, including a first CC 205-*a*, a second CC 205-*b*, and a third CC 205-*c*.

In some cases, the CCs 205 may include a group of CCs 225 that includes a PCC 230, a first SCC 235, or a second SCC 240. In some deployments, PUCCH 210 may be transmitted only on PCC 230, but in other deployments a PUCCH 210 carrier switch may provide that one or more of first SCC 235 or second SCC 240 may be used to transmit PUCCH 210. The CCs 205 that may carry PUCCH 210 may be configured by the base station 105-*a*, and may be indicated to the UE 115-*a* in configuration information. Such configuration information may be provided to the UE 115-*a* in any available signaling, such as in PDCCH 220, in radio resource control (RRC) signaling, in one or more MAC control elements (CEs), in downlink control information (DCI), or any combinations thereof. In some cases, multiplexing of one or more PUCCH 210 transmissions, one or more PUSCH 215 transmissions, or any combinations thereof, may be performed such that two or more transmissions are multiplexed on a PUCCH 210 or PUSCH 215, on one or more of the CCs 205. Such techniques may provide for reduced resource usage for uplink transmissions, may provide reduced latency in transmission of HARQ acknowledgment feedback for one or more downlink transmissions, and may enhance efficiency of wireless communications.

Figure 3:
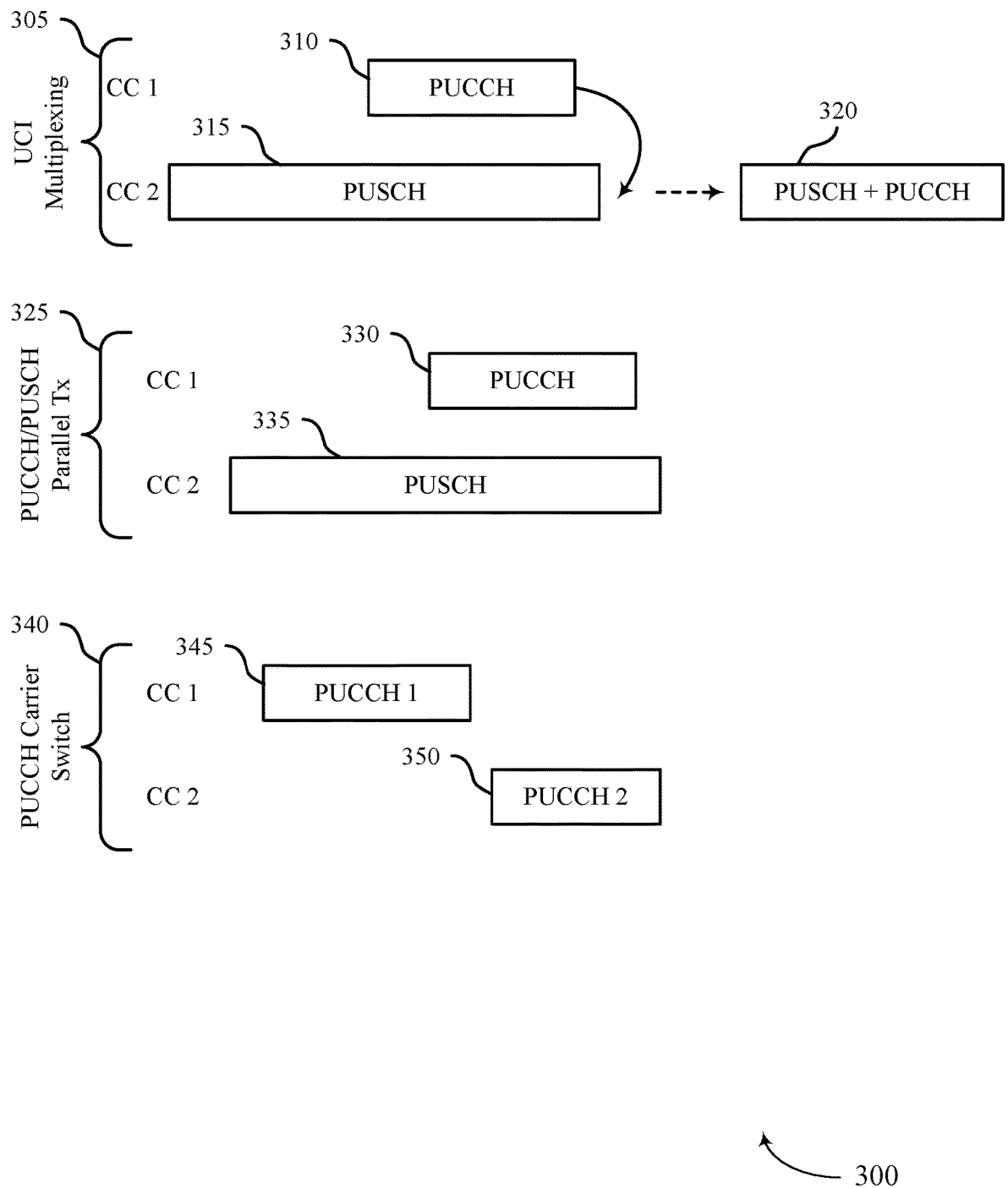
FIG. 3 illustrates an example of shared and control channel multiplexing techniques for multiple uplink component carriers in accordance with aspects of the present disclosure.

FIG. 3 illustrates an example of a shared and control channel multiplexing 300 that supports multiplexing techniques for multiple uplink component carriers in accordance with aspects of the present disclosure. In some examples, shared and control channel multiplexing 300 may be implemented in aspects of wireless communications systems 100 or 200. In this example, a base station (e.g., a base station 105 of FIG. 1 or 2) may configure multiple CCs at a UE (e.g., a UE 115 of FIG. 1 or 2), which may include multiple uplink CCs.

In some cases, the base station may configure uplink CCs for different types of multiplexing, or combinations of different types of multiplexing. In this example, three types of multiplexing may include uplink control information (UCI) multiplexing 305, PUSCH/PUCCH parallel transmission 325, and PUCCH carrier switch 340. In UCI multiplexing 305, a PUCCH transmission 310 on a first CC may be multiplexed with a PUSCH transmission 315 on a second CC to generate a multiplexed PUSCH+PUCCH transmission 320 that may be transmitted on the second CC. In some cases, the multiplexing may include appending PUCCH information to the PUSCH data prior to channel coding and transmission, although any suitable type of multiplexing may be used (e.g., puncturing, prepending, superposition coding, rate matching PUSCH around PUCCH, etc.).

In cases where PUSCH/PUCCH parallel transmission 325 are configured, the first CC may transmit PUCCH transmission 330 and the second CC may transmit PUSCH transmission 335 where the PUCCH transmission 330 and PUSCH transmission 335 at least partially overlap in the time domain such that concurrent transmissions on the different CCs are transmitted. In some cases, PUSCH/PUCCH parallel transmission 325 may be configured on a per UE basis, which may allow control information transmissions on each PCC configured at a UE. In other cases, PUSCH/PUCCH parallel transmission 325 may be configured on a per PCC basis, where CCs may be configured as "data only" CCs and "UCI allowed" CCs, and control information may be transmitted only on the CCs configured to allow UCI. In cases where PUCCH carrier switch 340 is configured, the first CC may be a PCC that transmits first PUCCH 345, and the second CC may be a SCC that is configured to transmit control information and that transmits second PUCCH 350.

In some cases, a base station may configure two or more types of multiplexing for uplink CA. In some cases, the types of multiplexing that are configured for a UE may be based on a capability of the UE, network conditions, a type of network deployment, types of data to be transmitted, or any combinations thereof. For example, different network deployments may support different communications standards, such as a 5G NR deployment based on Release 15, Release 16, or Release 17 of the 3GPP 5G standards. Further, different served UEs may be capable of communications according to certain releases, such as a UE that is capable of Release 15 communications but not later releases. The different releases may support different multiplexing features, and various aspects of the present disclosure provide techniques for implementing different combinations of multiplexing types that may be based on different releases. For example, a UE capable of operating using release 15 and lower may support combinations of multiplexing that include: UCI multiplexing 305 and PUSCH/PUCCH parallel transmission 325; UCI multiplexing 305 and PUCCH carrier switch 340; or UCI multiplexing 305 and PUSCH/PUCCH parallel transmission 325 and PUCCH carrier switch 340. Likewise, such different combinations may be supported for UEs that support Release 16, Release 17, or any other releases or radio access technologies that may support carrier aggregation for uplink communications.

Depending upon the combination of types of multiplexing that are configured at a UE, overlapping or concurrent communications may be multiplexed together and transmitted based on certain orders of multiplexing operations. For example, a UE may be configured for both UCI multiplexing and PUCCH/PUSCH parallel transmission, but not for PUCCH carrier switching. In such a case, UCI multiplexing is performed only on a PCC. In other cases, if the parallel transmission feature is configured per PCC (e.g., a CC is configured as a data only CC or a UCI allowed CC), the multiplexing may be performed in two steps. A first step may include UCI multiplexing within PUCCH channels (e.g., HARQ ACK/NACK may be multiplexed with a scheduling request (SR)), and a second step for each PUCCH (which may or may not have multiplexed UCI) may include multiplexing the PUCCH on a PUSCH from a set of candidate overlapping PUSCH. The candidate PUSCH may include overlapping PUSCHs on UCI allowed CCs, while the PUSCHs on data only CCs are excluded.

In some cases, the UE and network may operate in accordance with Release 16 of the 3GPP standards, which may provide for prioritization of certain channels over other channels. For example, high priority communications (e.g., URLLC communications) may be transmitted ahead of lower priority communications (e.g., eMBB communications). In such cases, if a UE is configured with both UCI multiplexing and PUCCH/PUSCH parallel transmission, channel priority may also be considered when multiplexing multiple channels, with lower priority channels dropped in the event of a collision with a higher priority channel. In cases where parallel transmissions are configured per UE, UCI multiplexing on the PUCCH/PUSCH procedure only occurs within a PCC. If the parallel transmission feature is configured per PCC, the UE may first resolve overlapping PUCCH/PUSCH channels of same priority and perform UCI multiplexing within PUCCH channels on PCC and then for each (merged) PUCCH, if applicable, it is multiplexed on a PUSCH from a set of candidate overlapping PUSCH. The candidate PUSCH includes overlapping PUSCHs on UCI allowed CCs, while the PUSCHs on data only CCs are excluded. Then, when checking overlapping PUCCH and PUSCH with different priorities, for each PUCCH, the UE only checks overlapping PUSCHs on UCI allowed CCs, while the PUSCHs on data only CCs are excluded.

In other cases, the UE and network may operate in accordance with Release 17 of the 3GPP standards, which may provide for prioritization of certain channels and also provide for multiplexing of channels having different priorities in some instances. In such cases, a UE may multiplex same priority channels first, followed by multiplexing between different priority channels. In such cases, resolution for colliding PUCCH and PUSCH with different priorities, rather than dropping the low priority channel and transmitting the high priority channel, may be to multiplex PUCCH on PUSCH even though they have different priority.

Figure 4:
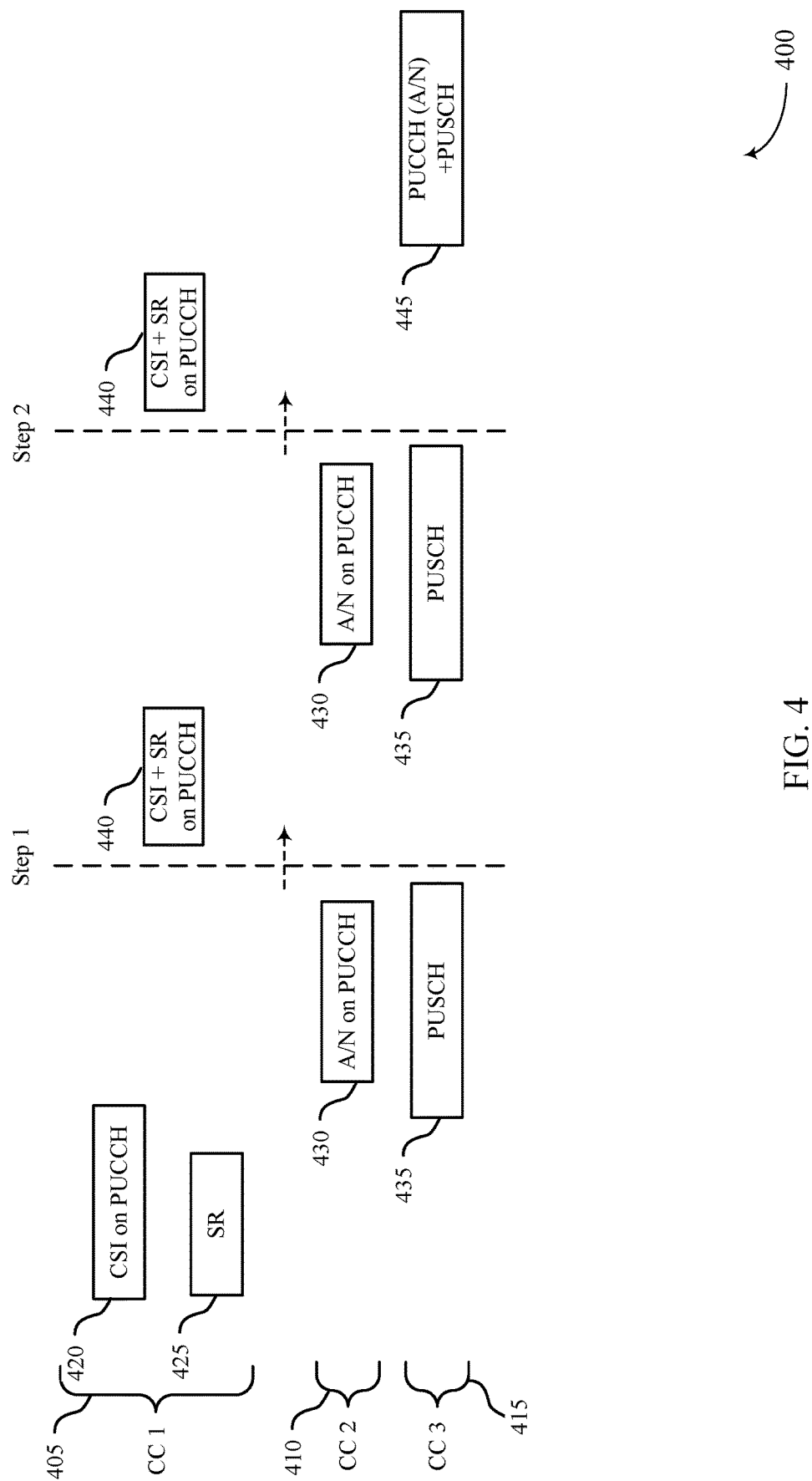
FIGS. 4 through 9 illustrate examples of control channel and shared channel multiplexing techniques for multiple uplink component carriers in accordance with aspects of the present disclosure.

FIG. 4 illustrates an example of control channel and shared channel multiplexing 400 that supports multiplexing techniques for multiple uplink component carriers in accordance with aspects of the present disclosure. In some examples, control channel and shared channel multiplexing 400 may be implemented in aspects of wireless communications systems 100 or 200. In this example, a base station (e.g., a base station 105 of FIG. 1 or 2) may configure multiple CCs at a UE (e.g., a UE 115 of FIG. 1 or 2), which may include multiple uplink CCs.

In this example, the UE may be configured for UCI multiplexing and PUCCH carrier switching, and may also be configured with a first CC 405, a second CC 410, and a third CC 415. PUCCH carrier switching in some cases may allow parallel PUCCH transmission on different CCs (e.g., HARQ ACK/NACK on SCC and CSI on PCC). In some cases, when multiplexing overlapping PUCCHs, the PUCCH on different CCs should be treated as non-overlapping PUCCHs, even if they physically overlap in time. Thus, the PUCCH multiplexing within PUCCHs is done on per CC basis. In this example, a CSI on PUCCH 420 and a SR 425 may be overlapping on the first CC 405, and may be multiplexed together in step 1 to form a CSI+SR on PUCCH 440. After PUCCH multiplexing on the per-CC basis, step 2 may include multiplexing PUCCHs (which may have been merged/multiplexed) on an overlapping PUSCH, on the same CC or across CCs, in a candidate set of overlapping PUSCHs. In the example of FIG. 4, the second CC 410 may have an ACK/NACK on PUCCH 430 that is overlapping with a PUSCH 435 on the third CC 415. In step 2, these communications may be multiplexed using UCI multiplexing into PUCCH+PUSCH 445 on the third CC 415.

Figure 5:
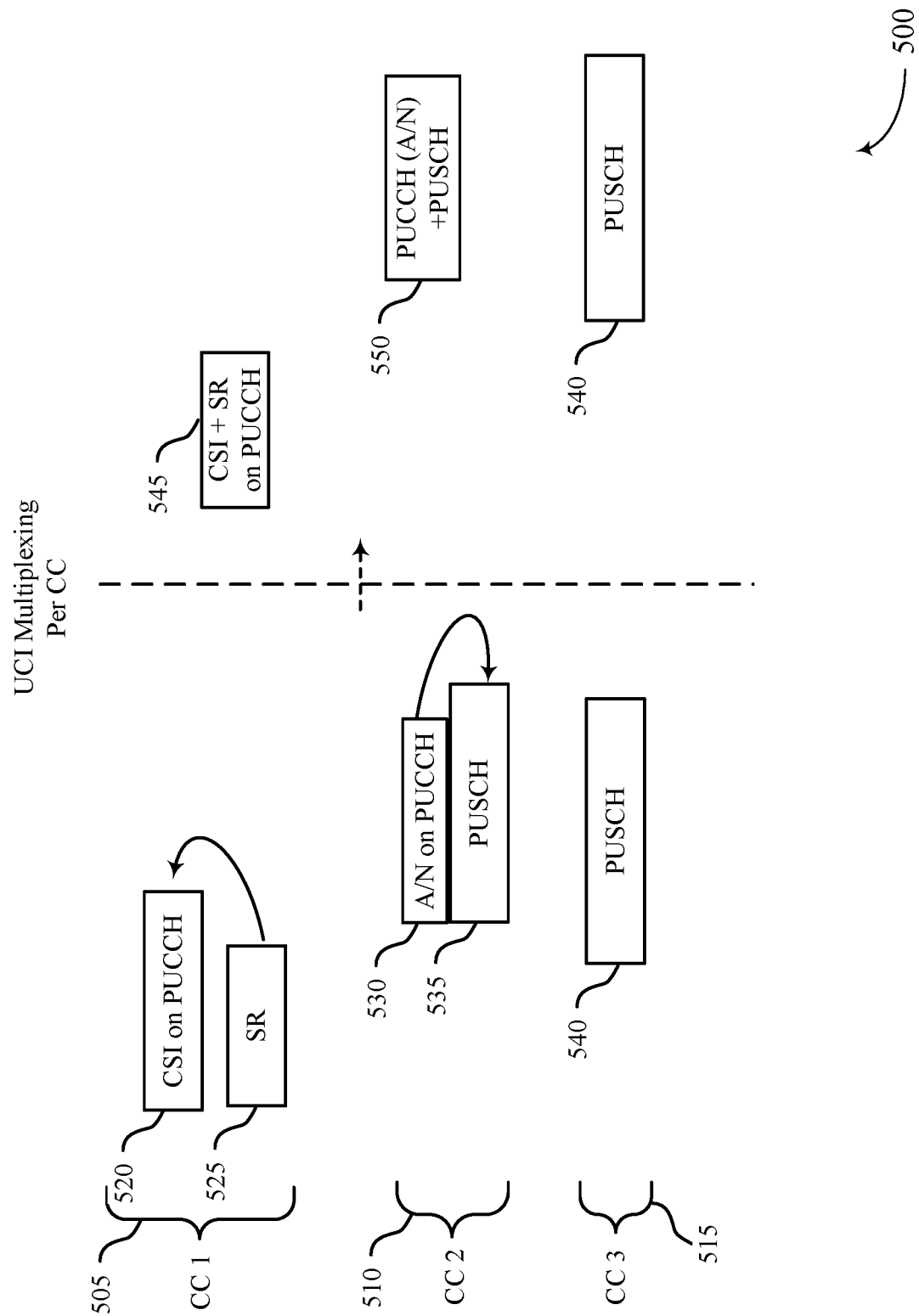

FIG. 5 illustrates an example of a control channel and shared channel multiplexing 500 that supports multiplexing techniques for multiple uplink component carriers in accordance with aspects of the present disclosure. In some examples, control channel and shared channel multiplexing 500 may be implemented in aspects of wireless communications systems 100 or 200. In this example, a base station (e.g., a base station 105 of FIG. 1 or 2) may configure multiple CCs at a UE (e.g., a UE 115 of FIG. 1 or 2), which may include multiple uplink CCs.

In this example, the UE may be configured for UCI multiplexing, PUSCH/PUCCH parallel transmission, and PUCCH carrier switching. The UE may also be configured with a first CC 505, a second CC 510, and a third CC 515. PUCCH carrier switching in some cases may allow parallel PUCCH transmission on different CCs (e.g., HARQ ACK/NACK on SCC and CSI on PCC). In the example of FIG. 5, parallel transmission is configured on a per-UE basis, and any CC may carry UCI. In some cases, when multiplexing overlapping PUCCHs, the PUCCH on different CCs should be treated as non-overlapping PUCCHs, even if they physically overlap in time. Thus, the PUCCH multiplexing within PUCCHs is done on a per-CC basis. In this example, a CSI on PUCCH 520 and a SR 525 may be overlapping on the first CC 505, and may be multiplexed together in step 1 to form a CSI+SR on PUCCH 545. After multiplexing any overlapping PUCCHs within each CC, UCI multiplexing may be performed. In this example, the second CC 510 may have an overlapping ACK/NACK on PUCCH 530 and PUSCH 535 which, in this example, may be multiplexed together into PUCCH+PUSCH 550 on the second CC 510. The third CC 515 may have a PUSCH 540 that is overlapping in time with the PUCCH and PUSCH channels of the second CC 510, which may be transmitted in parallel with the PUCCH+PUSCH 550.

Figure 6:
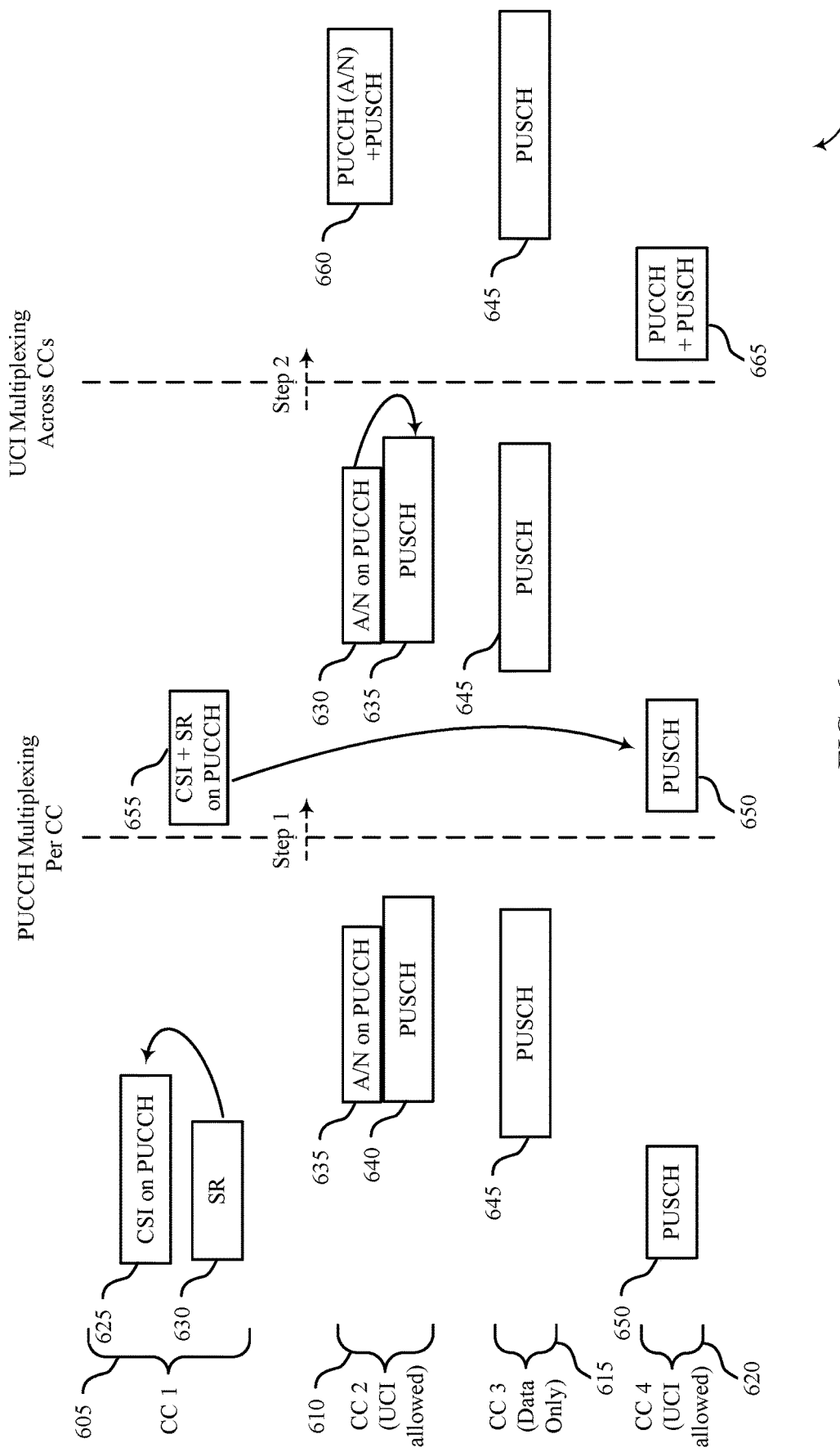

FIG. 6 illustrates an example of a control channel and shared channel multiplexing 600 that supports multiplexing techniques for multiple uplink component carriers in accordance with aspects of the present disclosure. In some examples, control channel and shared channel multiplexing 600 may be implemented in aspects of wireless communications systems 100 or 200. In this example, a base station (e.g., a base station 105 of FIG. 1 or 2) may configure multiple CCs at a UE (e.g., a UE 115 of FIG. 1 or 2), which may include multiple uplink CCs.

In this example, the UE may be configured for UCI multiplexing, PUSCH/PUCCH parallel transmission, and PUCCH carrier switching. The UE may also be configured with a first CC 605, a second CC 610, a third CC 615, and a fourth CC 620. In the example of FIG. 6, parallel transmission is configured on a per-CC basis, with the second CC 610 and the fourth CC 620 configured as a UCI allowed CCs, and the third CC 615 configured as a data only CC. In this example, again, when multiplexing overlapping PUCCHs, the PUCCH on different CCs should be treated as non-overlapping PUCCHs, even if they physically overlap in time, and thus the PUCCH multiplexing within PUCCHs is done on a per-CC basis. In this example, a CSI on PUCCH 625 and a SR 630 may be overlapping on the first CC 605, and may be multiplexed together in step 1 to form a CSI+SR on PUCCH 655. After multiplexing any overlapping PUCCHs within each CC, UCI multiplexing may be performed. In this example, the second CC 610 may have an overlapping ACK/NACK on PUCCH 635 and PUSCH 640 which, in this example, may be multiplexed together in step 2 into PUCCH+PUSCH 660 on the second CC 610. The third CC 615 may have a PUSCH 645 that is overlapping in time with the PUCCH and PUSCH channels of the second CC 610, which may be transmitted in parallel with the PUCCH+PUSCH 660. Further, the fourth CC 620 may have a PUSCH 650 that is overlapping with the CSI+SR on PUCCH 655, and in step 2 these may be multiplexed to form PUCCH+PUSCH 665 on the fourth CC 620, due to the fourth CC 620 being configured as a UCI allowed CC.

Figure 7:
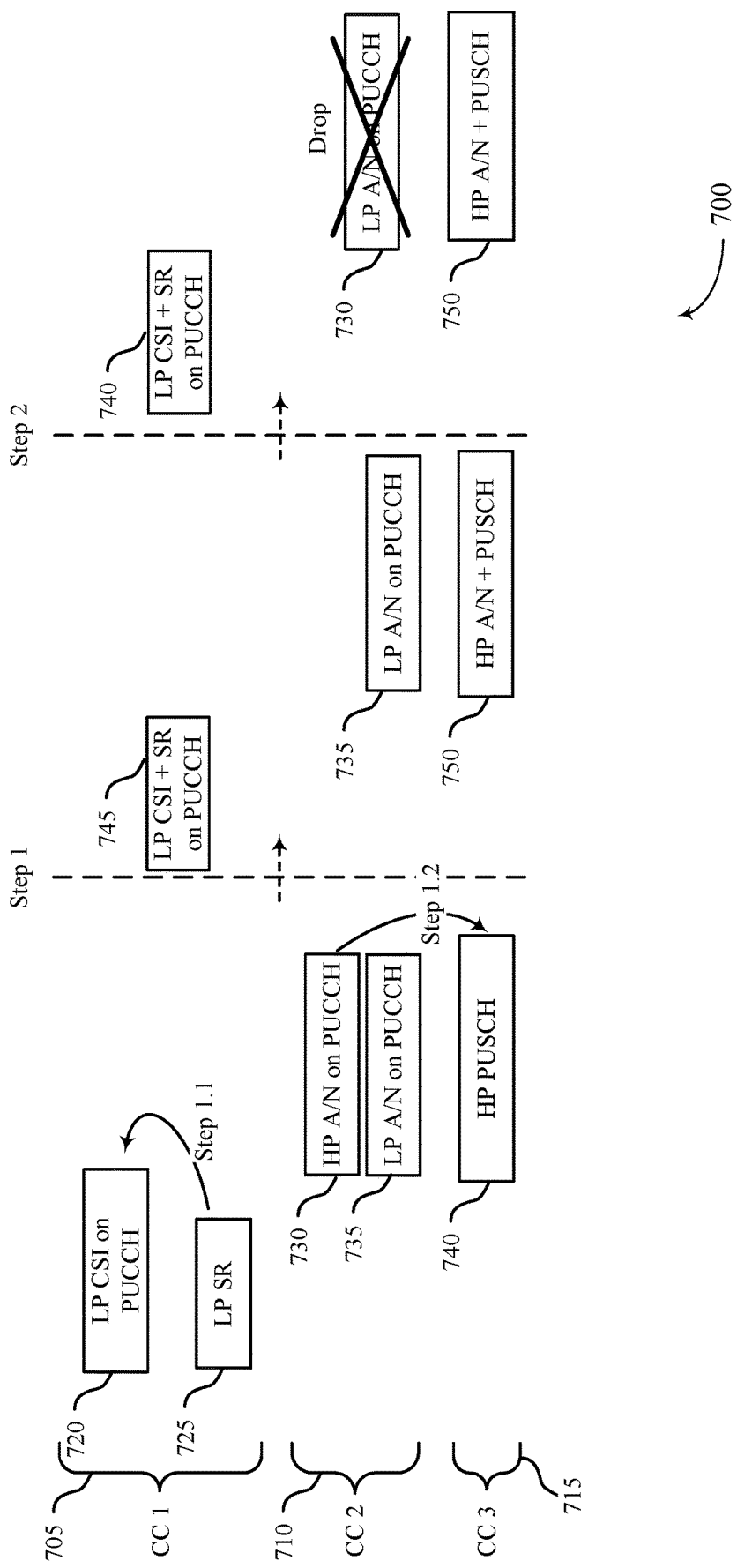

FIG. 7 illustrates an example of a control channel and shared channel multiplexing 700 that supports multiplexing techniques for multiple uplink component carriers in accordance with aspects of the present disclosure. In some examples, control channel and shared channel multiplexing 700 may be implemented in aspects of wireless communications systems 100 or 200. In this example, a base station (e.g., a base station 105 of FIG. 1 or 2) may configure multiple CCs at a UE (e.g., a UE 115 of FIG. 1 or 2), which may include multiple uplink CCs.

In this example, the UE may be configured to operate using channel prioritization (e.g., in accordance with Release 16 of the 3GPP specifications) and may be configured for UCI multiplexing and PUCCH carrier switching. In the example of FIG. 7, the UE may be configured with a first CC 705, a second CC 710, and a third CC 715. When multiplexing overlapping PUCCHs, in accordance with various aspects, the PUCCH on different CCs may be treated as non-overlapping PUCCHs, even if they physically overlap in time and thus the PUCCH multiplexing within PUCCHs is done on per CC basis. In this example, a low priority (LP) CSI on PUCCH 720 and a LP SR 725 may be overlapping on the first CC 705, and may be multiplexed together in a first part of step 1 (e.g., step 1.1) to form a LP CSI+SR on PUCCH 745. After PUCCH multiplexing on the per-CC basis, a second part of step 1 (e.g., step 1.2) may include prioritization of PUCCHs (which may have been merged/multiplexed) for multiplexing on an overlapping PUSCH, on the same CC or across CCs, in a candidate set of overlapping PUSCHs. In the example of FIG. 7, the second CC 710 may have a high priority (HP) ACK/NACK on PUCCH 730 and a LP ACK/NACK on PUCCH 735 that are overlapping with a PUSCH 740 on the third CC 715. In this case, the HP ACK/NACK on PUCCH 730 may be multiplexed with PUSCH 740 into HP ACK/NACK+PUSCH 750 on the third CC 715. In this case, in step 2, the LP ACK/NACK on PUCCH 735 may be dropped, thus providing transmission of the LP CSI+SR on PUCCH 745 of the first CC 705 and the HP ACK/NACK+PUSCH 750 on the third CC 715.

In some cases, the UE may be configured to operate using channel prioritization in which channels of different priorities may be multiplexed (e.g., in accordance with Release 17 of the 3GPP specifications) and may be configured for UCI multiplexing and PUCCH carrier switching. In such cases, the UE may multiplex the same priority channels first followed by multiplexing between different priority channels. Further, in such cases, in step 2, the resolution for colliding PUCCH and PUSCH with different priorities may be to multiplex PUCCH on PUSCH, although they have different priorities.

Figure 8:
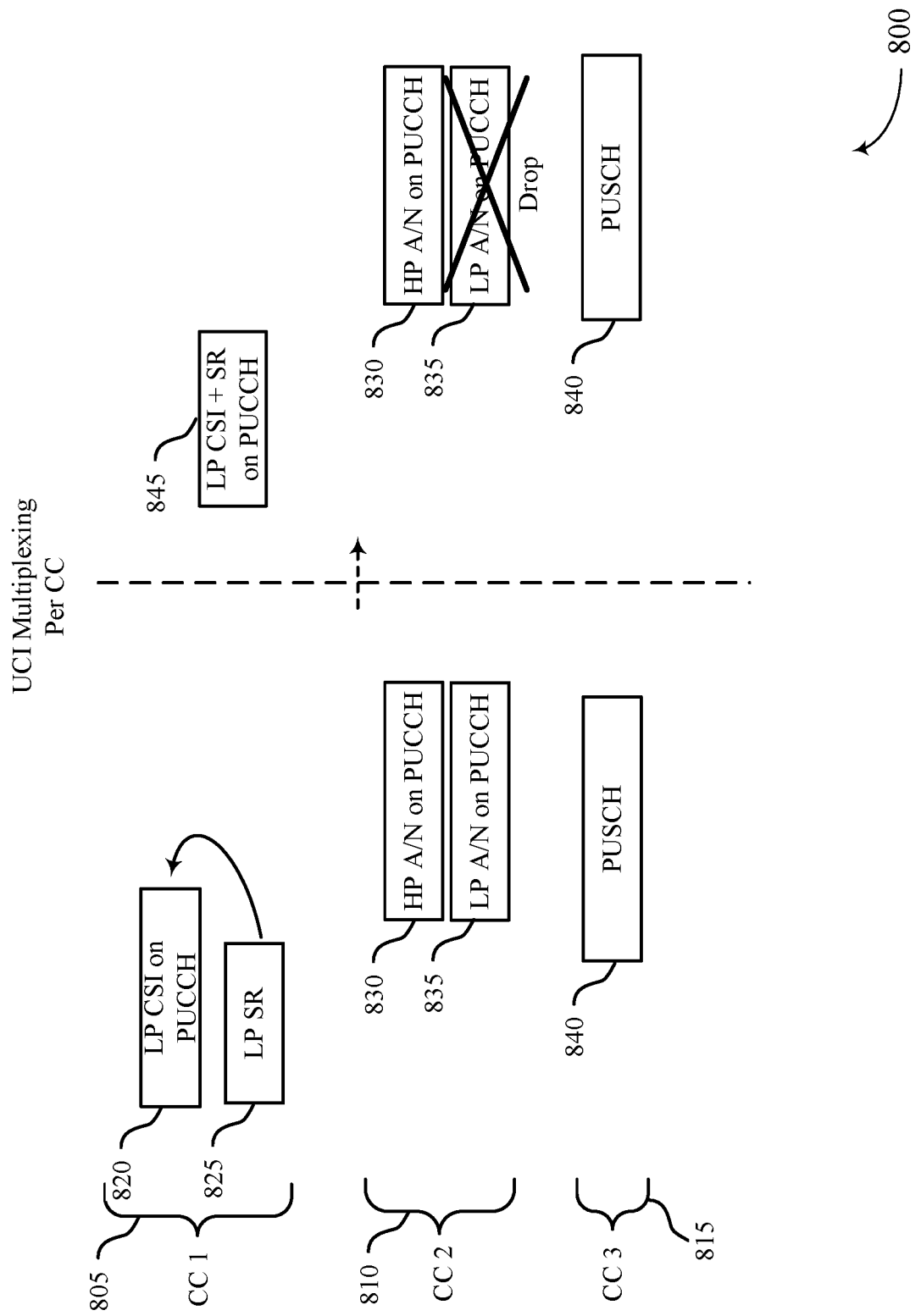

FIG. 8 illustrates an example of a control channel and shared channel multiplexing 800 that supports multiplexing techniques for multiple uplink component carriers in accordance with aspects of the present disclosure. In some examples, control channel and shared channel multiplexing 800 may be implemented in aspects of wireless communications systems 100 or 200. In this example, a base station (e.g., a base station 105 of FIG. 1 or 2) may configure multiple CCs at a UE (e.g., a UE 115 of FIG. 1 or 2), which may include multiple uplink CCs.

In this example, the UE may be configured for UCI multiplexing, PUSCH/PUCCH parallel transmission, and PUCCH carrier switching. The UE may also be configured with a first CC 805, a second CC 810, and a third CC 815. In the example of FIG. 8, parallel transmission is configured on a per-UE basis, and any CC may carry UCI. As discussed herein, when multiplexing overlapping PUCCHs, the PUCCH on different CCs may be treated as non-overlapping PUCCHs even if they physically overlap in time, thus the PUCCH multiplexing within PUCCHs is done on a per-CC basis. In this example, a LP CSI on PUCCH 820 and a LP SR 825 may be overlapping on the first CC 805, and may be multiplexed together to form a LP CSI+SR on PUCCH 845. After multiplexing any overlapping PUCCHs within each CC, UCI multiplexing may be performed. In this example, the second CC 810 may have an overlapping HP ACK/NACK on PUCCH 830 and LP ACK/NACK on PUCCH 835, and the third CC 815 may have an overlapping PUSCH 840 that is overlapping in time with the PUCCH and PUSCH channels of the second CC 810. In this example, the UE may not multiplex PUCCH and PUSCH of different priorities (e.g., when operating in accordance with Release 16 of the 3GPP specifications), and the UE may drop the LP ACK/NACK on PUCCH 835 on the second CC 810. Thus, in this example, the multiplexed LP CSI+SR on PUCCH 845 is transmitted on the first CC 805, the HP ACK/NACK on PUCCH 830 is transmitted on the second CC 810, and the PUSCH 840 is transmitted on the third CC 815.

Figure 9:
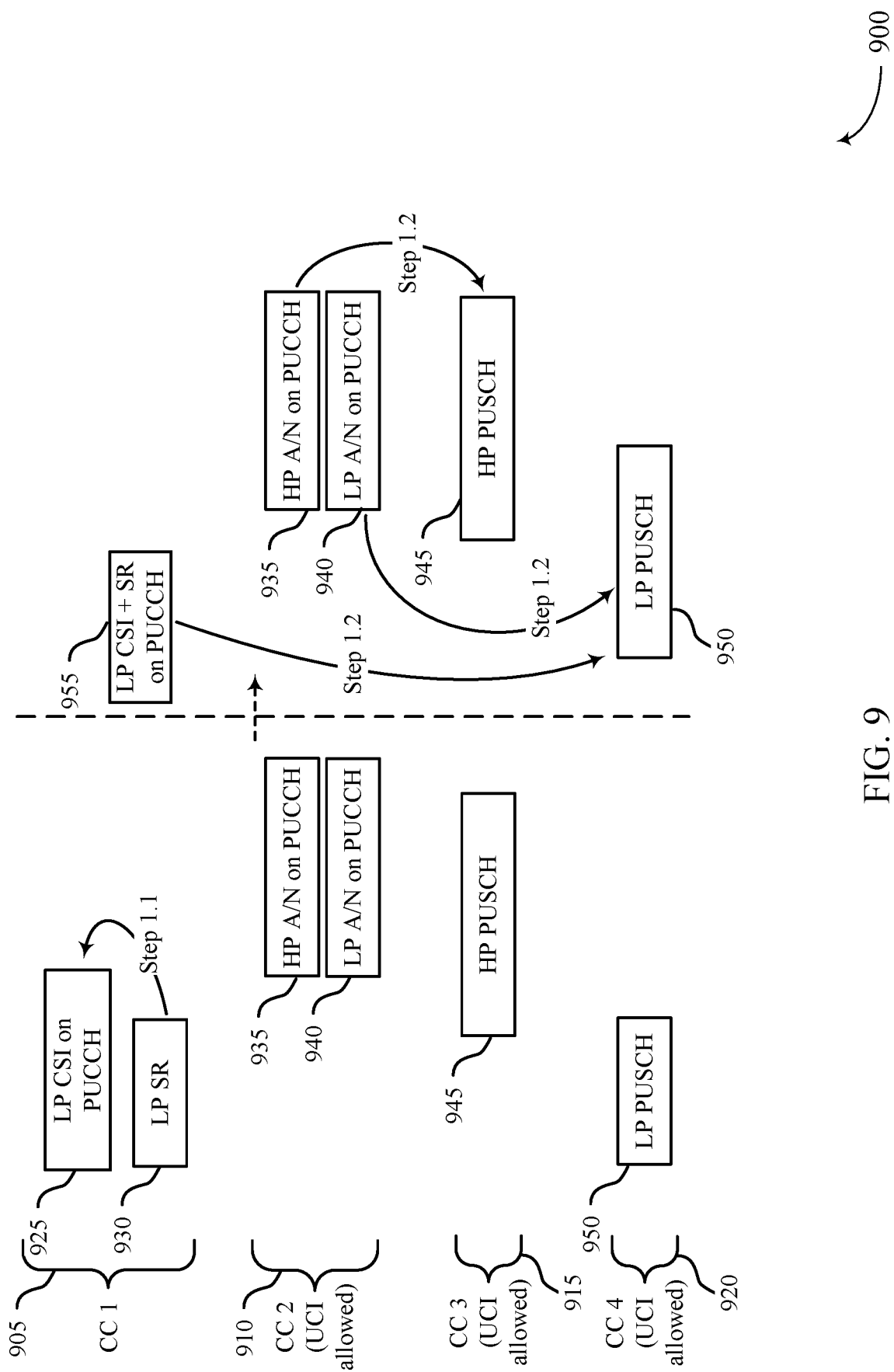

FIG. 9 illustrates an example of a control channel and shared channel multiplexing 900 that supports multiplexing techniques for multiple uplink component carriers in accordance with aspects of the present disclosure. In some examples, control channel and shared channel multiplexing 900 may be implemented in aspects of wireless communications systems 100 or 200. In this example, a base station (e.g., a base station 105 of FIG. 1 or 2) may configure multiple CCs at a UE (e.g., a UE 115 of FIG. 1 or 2), which may include multiple uplink CCs.

In this example, the UE may be configured for UCI multiplexing, PUSCH/PUCCH parallel transmission, and PUCCH carrier switching. The UE may also be configured with a first CC 905, a second CC 910, a third CC 915, and a fourth CC 920. In the example of FIG. 9, parallel transmission is configured on a per-CC basis, with the second CC 910, third CC 915, and the fourth CC 920 configured as a UCI allowed CCs. In this example, again, when multiplexing overlapping PUCCHs, the PUCCH on different CCs should be treated as non-overlapping PUCCHs, even if they physically overlap in time, and thus the PUCCH multiplexing within PUCCHs is done on a per-CC basis.

In this example, a LP CSI on PUCCH 925 and a LP SR 930 may be overlapping on the first CC 905, and may be multiplexed together in step 1.1 to form a LP CSI+SR on PUCCH 955. After multiplexing any overlapping PUCCHs within each CC, UCI multiplexing may be performed. In this example, the second CC 910 may have an overlapping HP ACK/NACK on PUCCH 935 and LP ACK/NACK on PUCCH 940. The third CC 915 may have a HP PUSCH 945 that is overlapping in time with the PUCCH channels of the second CC 910. Further, the fourth CC 920 may have a LP PUSCH 950 that is overlapping with the LP CSI+SR on PUCCH 955. In this example, the UE may resolve PUCCH/PUSCH overlap within same priority (e.g., when the UE is operating in accordance with Release 16), and may multiplex, in step 1.2, channels of a same priority to multiplex the LP CSI+SR on PUCCH 955 and the LP ACK/NACK on PUCCH 940 with the LP PUSCH 950, which may then be transmitted on the fourth CC 920. Likewise, the HP ACK/NACK on PUCCH 935 may be multiplexed with the HP PUSCH 945 and transmitted on the third CC 915.

In cases where the UE may be configured to operate using channel prioritization in which channels of different priorities may be multiplexed (e.g., in accordance with Release 17 of the 3GPP specifications), the UE may multiplex the same priority channels first followed by multiplexing between different priority channels. In such cases, the resolution for colliding PUCCH and PUSCH with different priorities may be to multiplex PUCCH on PUSCH, although they have different priorities.

Figure 10:
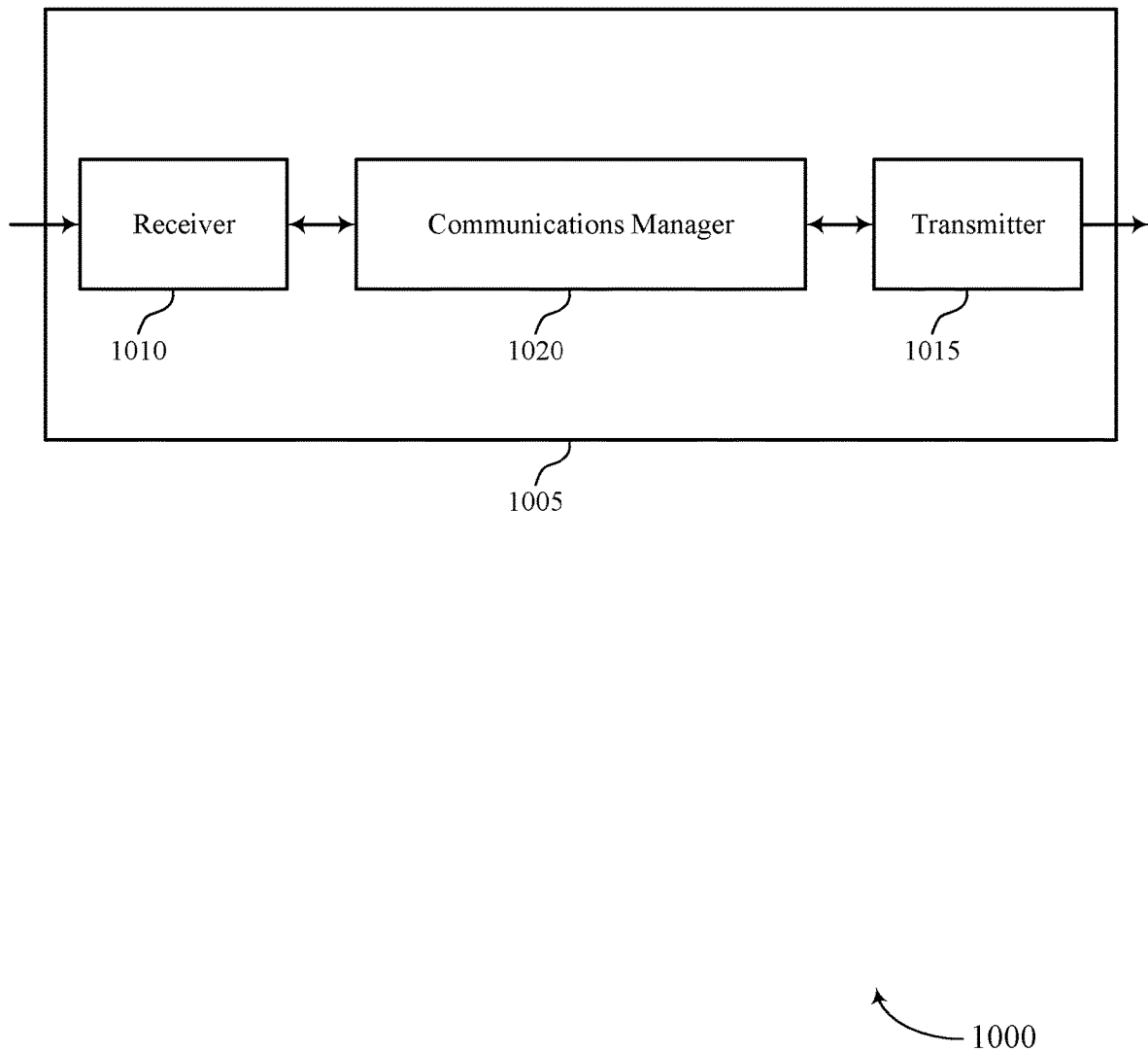
FIGS. 10 and 11 show block diagrams of devices that support multiplexing techniques for multiple uplink component carriers in accordance with aspects of the present disclosure.

FIG. 10 shows a block diagram 1000 of a device 1005 that supports multiplexing techniques for multiple uplink component carriers in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multiplexing techniques for multiple uplink component carriers). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multiplexing techniques for multiple uplink component carriers). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of multiplexing techniques for multiple uplink component carriers as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for receiving, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The communications manager 1020 may be configured as or otherwise support a means for multiplexing, for each of the first component carrier and the second component carrier, two or more control channel communications on the associated component carrier that being overlapping in the time domain. The communications manager 1020 may be configured as or otherwise support a means for multiplexing, after multiplexing the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications. The communications manager 1020 may be configured as or otherwise support a means for transmitting multiplexed control information and uplink shared channel communications based on the multiplexing the control channel communications with the uplink shared channel communications.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for multiplexing in uplink CA that provides for more efficient utilization of communication resources, and reduced power consumption (e.g., by transmitting on fewer CCs in some instances).

Figure 11:
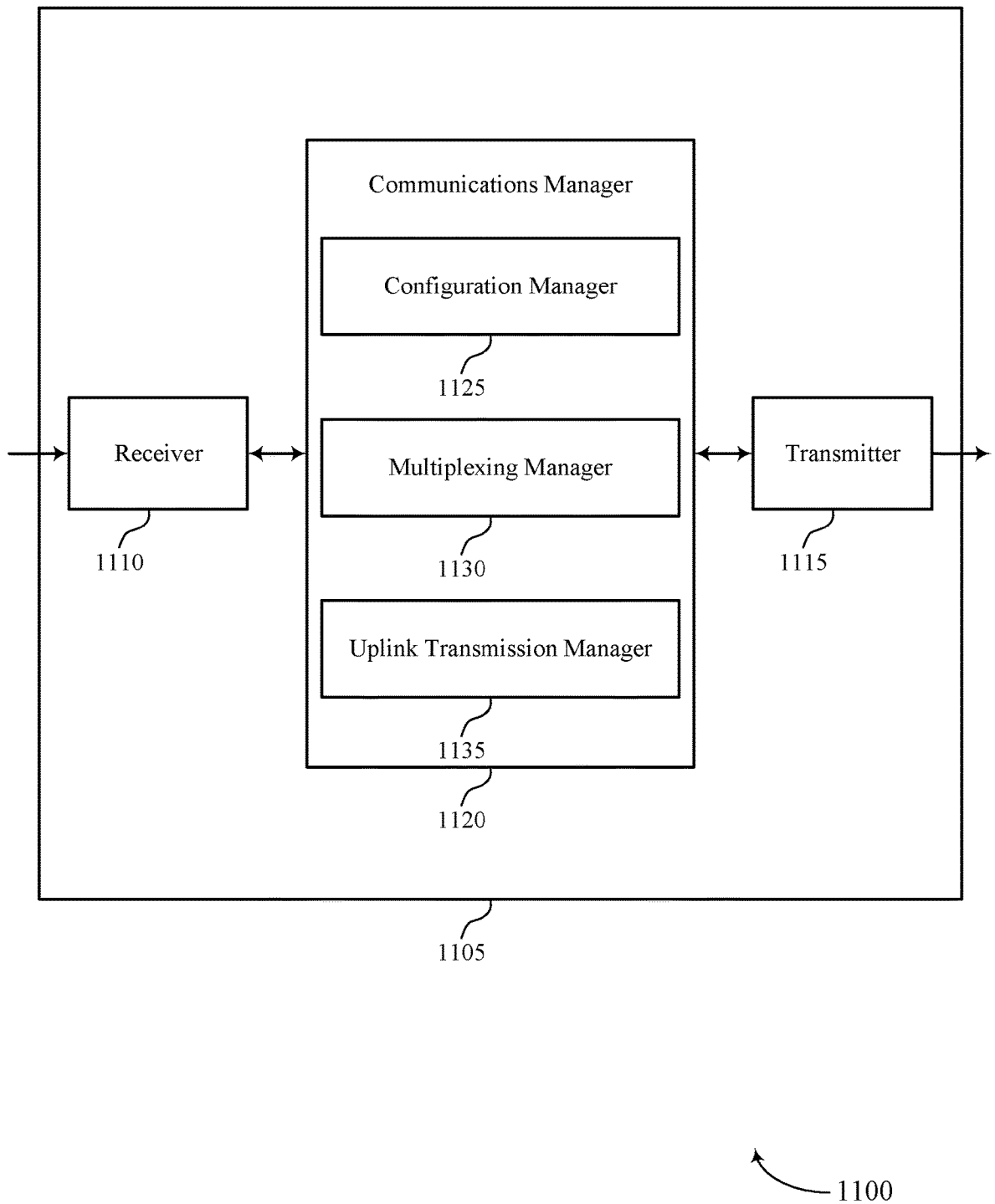

FIG. 11 shows a block diagram 1100 of a device 1105 that supports multiplexing techniques for multiple uplink component carriers in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multiplexing techniques for multiple uplink component carriers). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multiplexing techniques for multiple uplink component carriers). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of multiplexing techniques for multiple uplink component carriers as described herein. For example, the communications manager 1120 may include a configuration manager 1125, a multiplexing manager 1130, an uplink transmission manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The configuration manager 1125 may be configured as or otherwise support a means for receiving, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The multiplexing manager 1130 may be configured as or otherwise support a means for multiplexing, for each of the first component carrier and the second component carrier, two or more control channel communications on the associated component carrier that are overlapping in the time domain. The multiplexing manager 1130 may be configured as or otherwise support a means for multiplexing, after multiplexing the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications. The uplink transmission manager 1135 may be configured as or otherwise support a means for transmitting multiplexed control information and uplink shared channel communications based on the multiplexing the control channel communications with the uplink shared channel communications.

Figure 12:
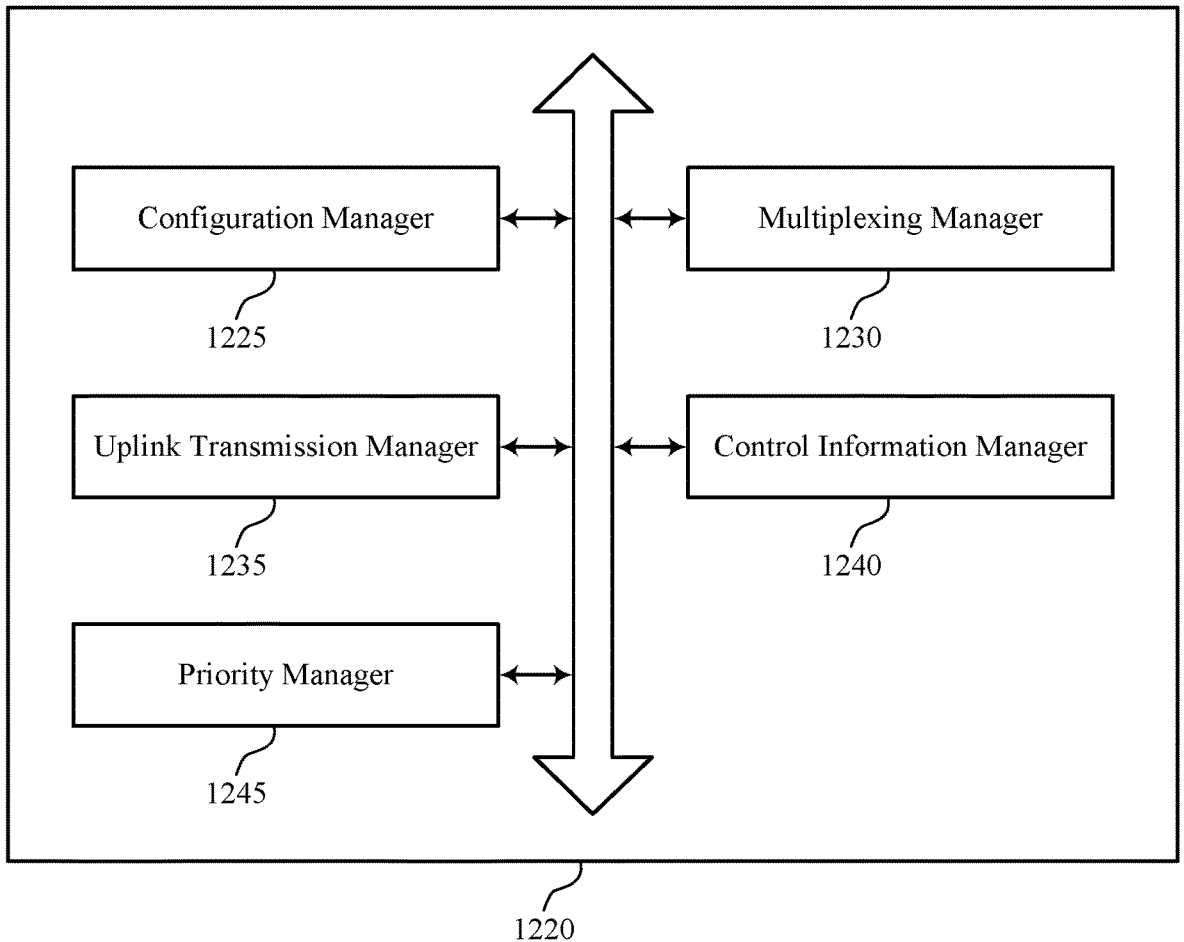
FIG. 12 shows a block diagram of a communications manager that supports multiplexing techniques for multiple uplink component carriers in accordance with aspects of the present disclosure.

FIG. 12 shows a block diagram 1200 of a communications manager 1220 that supports multiplexing techniques for multiple uplink component carriers in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of multiplexing techniques for multiple uplink component carriers as described herein. For example, the communications manager 1220 may include a configuration manager 1225, a multiplexing manager 1230, an uplink transmission manager 1235, a control information manager 1240, a priority manager 1245, or any combination thereof. Each of these components may communicate, directly or indirectly, with one another (e.g., via one or more buses).

The communications manager 1220 may support wireless communication at a UE in accordance with examples as disclosed herein. The configuration manager 1225 may be configured as or otherwise support a means for receiving, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The multiplexing manager 1230 may be configured as or otherwise support a means for multiplexing, for each of the first component carrier and the second component carrier, two or more control channel communications on the associated component carrier that are overlapping in the time domain. In some examples, the multiplexing manager 1230 may be configured as or otherwise support a means for multiplexing, after multiplexing the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications. The uplink transmission manager 1235 may be configured as or otherwise support a means for transmitting multiplexed control information and uplink shared channel communications based on the multiplexing the control channel communications with the uplink shared channel communications.

In some examples, to support multiplexing the two or more control channel communications for each component carrier, the multiplexing manager 1230 may be configured as or otherwise support a means for multiplexing any control channel communications of a same component carrier that are overlapping in the time domain, and where any control channel communications of any component carrier that are non-overlapping with any other control channel communications of that component carrier are not multiplexed together.

In some examples, to support multiplexing the control channel communications with the uplink shared channel communications, the multiplexing manager 1230 may be configured as or otherwise support a means for determining that a first control channel communication and a second control channel communication associated with the first component carrier are multiplexed in a first multiplexed control channel communication associated with the first component carrier. In some examples, to support multiplexing the control channel communications with the uplink shared channel communications, the multiplexing manager 1230 may be configured as or otherwise support a means for determining that a third control channel communication associated with the second component carrier is overlapping in the time domain with a first uplink shared channel communication on the different component carrier. In some examples, to support multiplexing the control channel communications with the uplink shared channel communications, the multiplexing manager 1230 may be configured as or otherwise support a means for multiplexing the third control channel communication and the first uplink shared channel communication for transmission on the different component carrier, and where the first multiplexed control channel communication is transmitted on the first component carrier.

In some examples, the third control channel communication associated with the second component carrier is treated as non-overlapping with both the first control channel communication and the second control channel communication irrespective of whether either of the first control channel communication or the second control channel communication are overlapping with the third control channel communication in the time domain. In some examples, the control channel communications include channel state information, scheduling request information, acknowledgment/negative-acknowledgment feedback, or any combinations thereof.

In some examples, the multiplexing the control channel communications with the uplink shared channel communications is performed on a per-component carrier basis to multiplex the control channel communications and the uplink shared channel communications on a same component carrier, and where the transmitting includes transmitting uplink communications concurrently on two or more component carriers of the set of multiple uplink component carriers.

In some examples, the multiplexing the control channel communications with the uplink shared channel communications procedure is performed across component carriers to multiplex control channel communications of one or more of the first component carrier or the second component carrier with the uplink shared channel communications of the different component carrier based on the different component carrier being configured for control channel communications.

In some examples, a first subset of the set of multiple uplink component carriers are configured to allow control channel communications or shared channel communications, and a second subset of the set of multiple uplink component carriers are configured to allow uplink shared channel communications only, and where the multiplexing the control channel communications with the uplink shared channel communications is performed across component carriers only for the first subset of the set of multiple uplink component carriers.

In some examples, the multiplexing the two or more control channel communications for each component carrier is based on a priority associated with each of the two or more control channel communications on the associated component carrier. In some examples, the multiplexing the control channel communications with the uplink shared channel communications is based on a first priority associated with the control channel communications from one or more of the first component carrier or the second component carrier and a second priority associated with the uplink shared channel communications.

In some examples, the multiplexing the control channel communications with the uplink shared channel communications is performed across component carriers to multiplex control channel communications of one or more of the first component carrier or the second component carrier with the uplink shared channel communications of the different component carrier based on the different component carrier being configured to allow control channel communications and further based on a priority associated with the control channel communications and the uplink shared channel communications. In some examples, two or more control channel communications having different priorities are multiplexed together for transmission.

Figure 13:
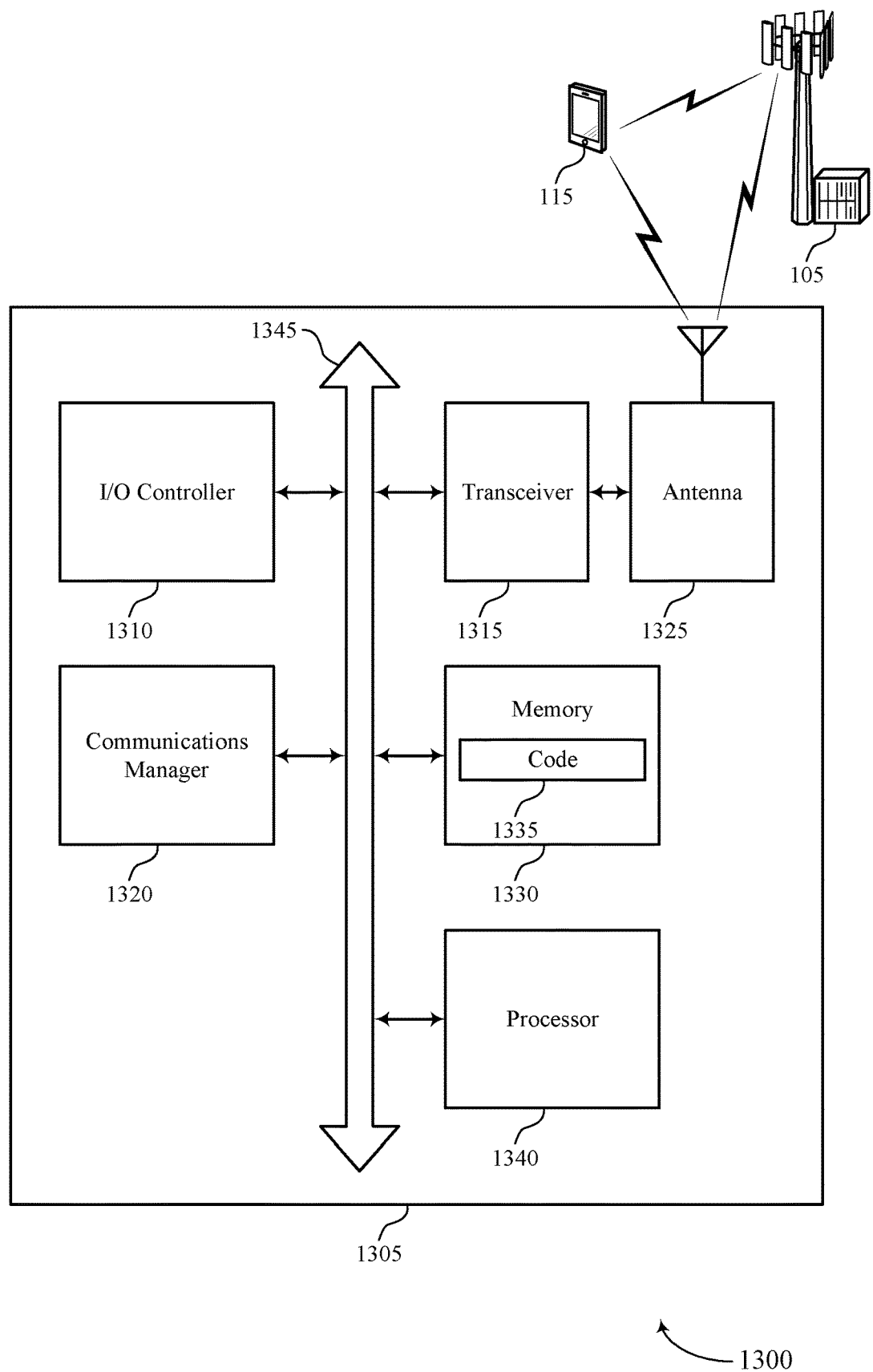
FIG. 13 shows a diagram of a system including a device that supports multiplexing techniques for multiple uplink component carriers in accordance with aspects of the present disclosure.

FIG. 13 shows a diagram of a system 1300 including a device 1305 that supports multiplexing techniques for multiple uplink component carriers in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting multiplexing techniques for multiple uplink component carriers). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The communications manager 1320 may be configured as or otherwise support a means for multiplexing, for each of the first component carrier and the second component carrier, two or more control channel communications on the associated component carrier that being overlapping in the time domain. The communications manager 1320 may be configured as or otherwise support a means for multiplexing, after multiplexing the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications. The communications manager 1320 may be configured as or otherwise support a means for transmitting multiplexed control information and uplink shared channel communications based on the multiplexing the control channel communications with the uplink shared channel communications.

By including or configuring the communications manager 1320 in accordance with examples as described herein, the device 1305 may support techniques for multiplexing in uplink CA that provides for more efficient utilization of communication resources, reduced power consumption (e.g., by transmitting on fewer CCs in some instances), improved user experience related to reduced latency and reduced power consumption, and longer battery life.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of multiplexing techniques for multiple uplink component carriers as described herein, or the processor 1340 and the memory 1330 may be otherwise configured to perform or support such operations.

Figure 14:
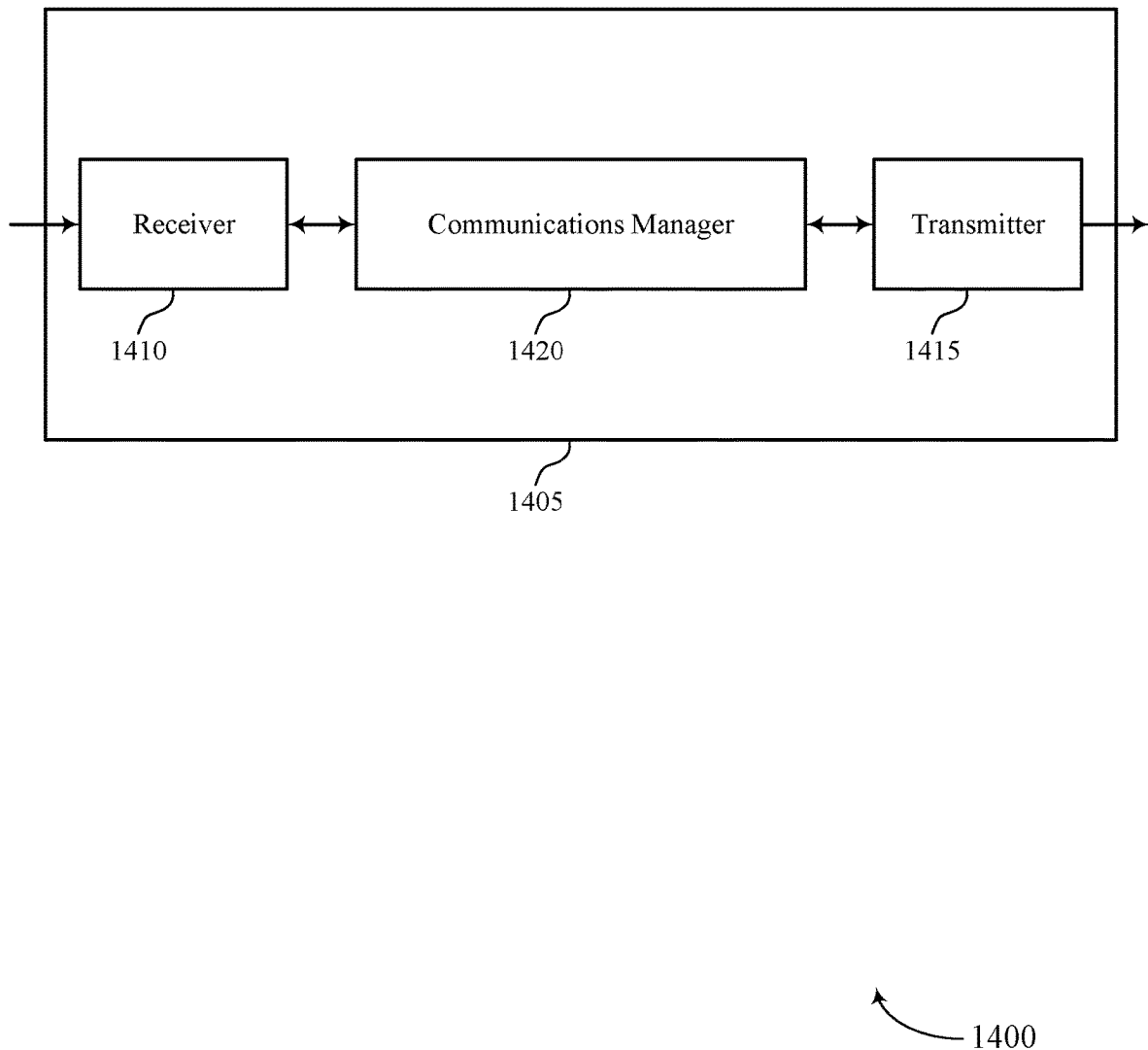
FIGS. 14 and 15 show block diagrams of devices that support multiplexing techniques for multiple uplink component carriers in accordance with aspects of the present disclosure.

FIG. 14 shows a block diagram 1400 of a device 1405 that supports multiplexing techniques for multiple uplink component carriers in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to multiplexing techniques for multiple uplink component carriers). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to multiplexing techniques for multiple uplink component carriers). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of multiplexing techniques for multiple uplink component carriers as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. For example, the communications manager 1420 may be configured as or otherwise support a means for transmitting, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The communications manager 1420 may be configured as or otherwise support a means for receiving uplink communications from the UE on one or more of the set of multiple uplink component carriers. The communications manager 1420 may be configured as or otherwise support a means for demultiplexing, for each of the first component carrier and the second component carrier, two or more control channel communications on the associated component carrier that are overlapping in the time domain. The communications manager 1420 may be configured as or otherwise support a means for demultiplexing the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for multiplexing in uplink CA that provides for more efficient utilization of communication resources, and reduced power consumption (e.g., by transmitting on fewer CCs in some instances).

Figure 15:
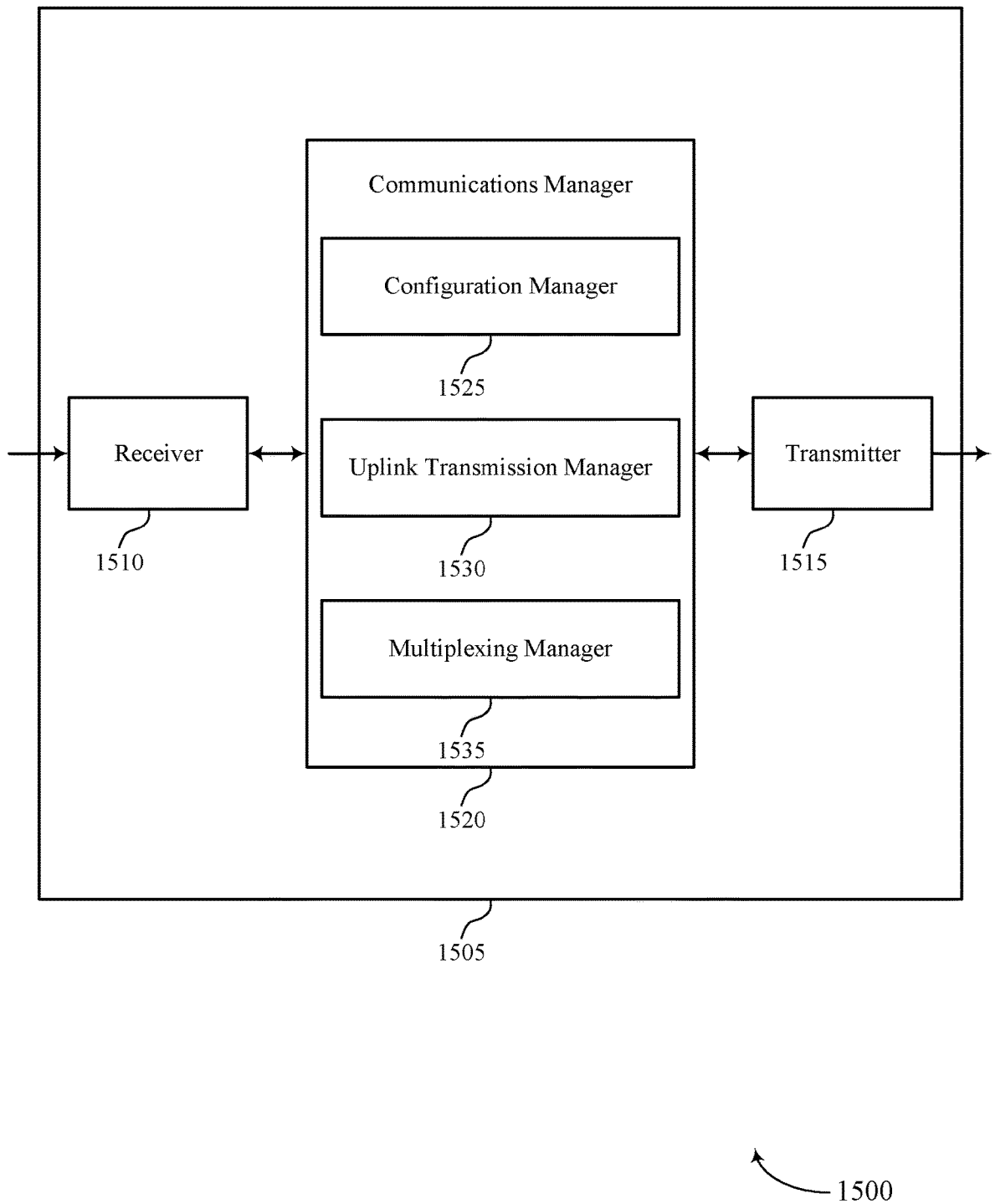

FIG. 15 shows a block diagram 1500 of a device 1505 that supports multiplexing techniques for multiple uplink component carriers in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to multiplexing techniques for multiple uplink component carriers). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to multiplexing techniques for multiple uplink component carriers). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of multiplexing techniques for multiple uplink component carriers as described herein. For example, the communications manager 1520 may include a configuration manager 1525, an uplink transmission manager 1530, a multiplexing manager 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. The configuration manager 1525 may be configured as or otherwise support a means for transmitting, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The uplink transmission manager 1530 may be configured as or otherwise support a means for receiving uplink communications from the UE on one or more of the set of multiple uplink component carriers. The multiplexing manager 1535 may be configured as or otherwise support a means for demultiplexing, for each of the first component carrier and the second component carrier, two or more control channel communications on the associated component carrier that are overlapping in the time domain. The multiplexing manager 1535 may be configured as or otherwise support a means for demultiplexing the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications.

Figure 16:
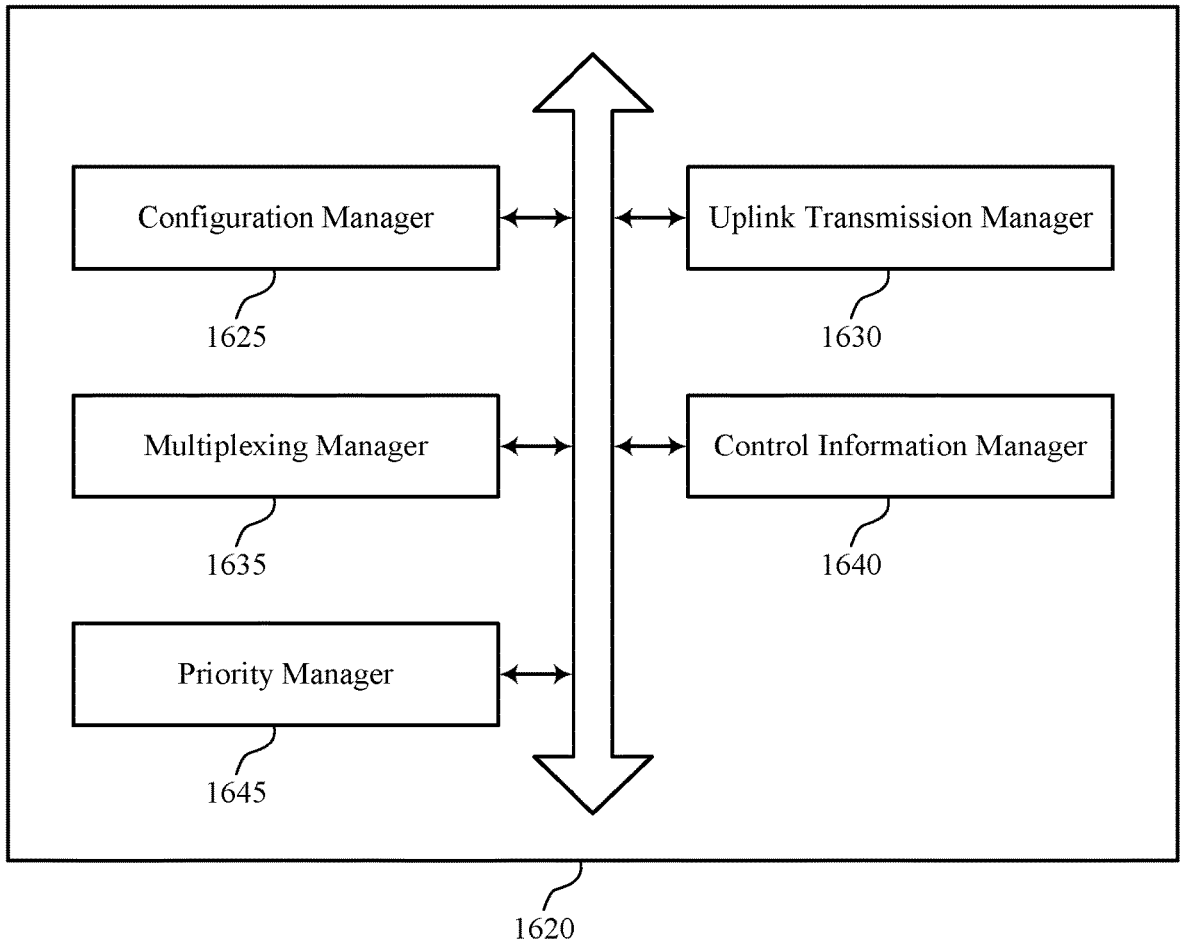
FIG. 16 shows a block diagram of a communications manager that supports multiplexing techniques for multiple uplink component carriers in accordance with aspects of the present disclosure.

FIG. 16 shows a block diagram 1600 of a communications manager 1620 that supports multiplexing techniques for multiple uplink component carriers in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of multiplexing techniques for multiple uplink component carriers as described herein. For example, the communications manager 1620 may include a configuration manager 1625, an uplink transmission manager 1630, a multiplexing manager 1635, a control information manager 1640, a priority manager 1645, or any combination thereof. Each of these components may communicate, directly or indirectly, with one another (e.g., via one or more buses).

The communications manager 1620 may support wireless communication at a base station in accordance with examples as disclosed herein. The configuration manager 1625 may be configured as or otherwise support a means for transmitting, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The uplink transmission manager 1630 may be configured as or otherwise support a means for receiving uplink communications from the UE on one or more of the set of multiple uplink component carriers. The multiplexing manager 1635 may be configured as or otherwise support a means for demultiplexing, for each of the first component carrier and the second component carrier, two or more control channel communications on the associated component carrier that are overlapping in the time domain. In some examples, the multiplexing manager 1635 may be configured as or otherwise support a means for demultiplexing the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications.

In some examples, to support demultiplexing the two or more control channel communications, the multiplexing manager 1635 may be configured as or otherwise support a means for demultiplexing any control channel communications of a same component carrier that are overlapping in the time domain, and where any control channel communications of any component carrier that are non-overlapping with any other control channel communications of that component carrier are not multiplexed together.

In some examples, the multiplexing manager 1635 may be configured as or otherwise support a means for demultiplexing a first control channel communication and a second control channel communication associated with the first component carrier in a first multiplexed control channel communication associated with the first component carrier, and where. In some examples, the multiplexing manager 1635 may be configured as or otherwise support a means for the demultiplexing the control channel communications and uplink shared channel communications is performed on an uplink communication on the different component carrier to demultiplex a third control channel communication associated with the second component carrier that is overlapping in the time domain with a first uplink shared channel communication on the different component carrier.

In some examples, the third control channel communication associated with the second component carrier is treated as non-overlapping with both the first control channel communication and the second control channel communication irrespective of whether either of the first control channel communication or the second control channel communication are overlapping with the third control channel communication in the time domain. In some examples, the control channel communications include channel state information, scheduling request information, acknowledgment/negative-acknowledgment feedback, or any combinations thereof.

In some examples, the demultiplexing the control channel communications and uplink shared channel communications is performed on a per-component carrier basis to demultiplex the control channel communications and the uplink shared channel communications on a same component carrier, and where the receiving includes receiving the uplink communications concurrently on two or more component carriers of the set of multiple uplink component carriers.

In some examples, the demultiplexing the control channel communications and uplink shared channel communications is performed across component carriers to demultiplex control channel communications of one or more of the first component carrier or the second component carrier and the uplink shared channel communications of the different component carrier based on the different component carrier being configured to allow control channel communications, and where the receiving includes receiving the uplink communications concurrently on the different component carrier and one or more of the first component carrier or the second component carrier.

In some examples, a first subset of the set of multiple uplink component carriers are configured to allow control channel communications or shared channel communications and a second subset of the set of multiple uplink component carriers are configured to allow uplink shared channel communications only.

In some examples, the demultiplexing the two or more control channel communications is based on a priority associated with each of the two or more control channel communications on the associated component carrier. In some examples, the demultiplexing the control channel communications and uplink shared channel communications is based on a first priority associated with the control channel communications from one or more of the first component carrier or the second component carrier and a second priority associated with the uplink shared channel communications.

In some examples, the demultiplexing the control channel communications and uplink shared channel communications is performed across component carriers to demultiplex control channel communications of one or more of the first component carrier or the second component carrier with the uplink shared channel communications of the different component carrier based on the different component carrier being configured to allow control channel communications and further based on a priority associated with the control channel communications and the uplink shared channel communications. In some examples, two or more control channel communications having different priorities are multiplexed together at the UE for transmission.

Figure 17:
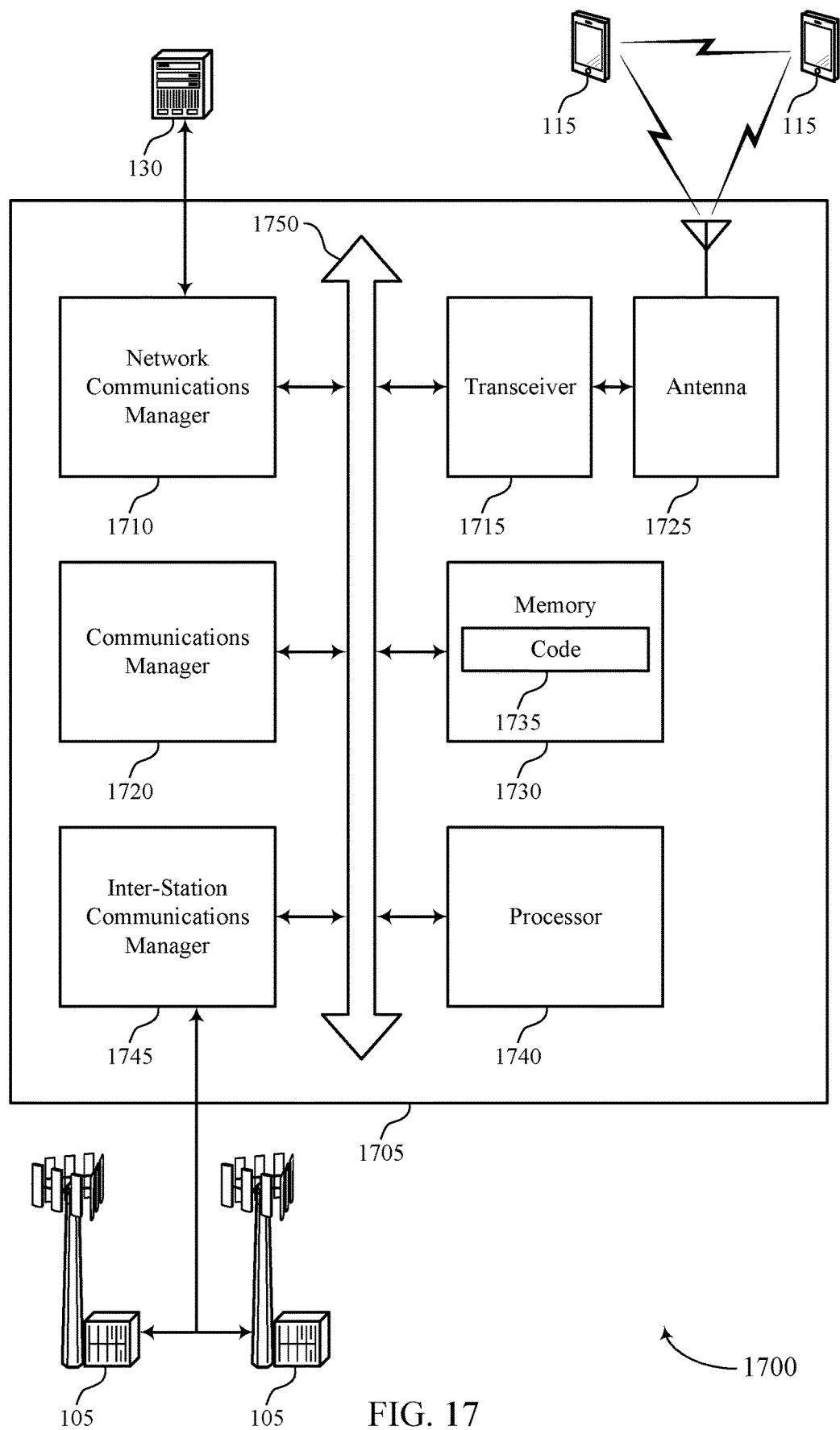
FIG. 17 shows a diagram of a system including a device that supports multiplexing techniques for multiple uplink component carriers in accordance with aspects of the present disclosure.

FIG. 17 shows a diagram of a system 1700 including a device 1705 that supports multiplexing techniques for multiple uplink component carriers in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting multiplexing techniques for multiple uplink component carriers). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a base station in accordance with examples as disclosed herein. For example, the communications manager 1720 may be configured as or otherwise support a means for transmitting, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The communications manager 1720 may be configured as or otherwise support a means for receiving uplink communications from the UE on one or more of the set of multiple uplink component carriers. The communications manager 1720 may be configured as or otherwise support a means for demultiplexing, for each of the first component carrier and the second component carrier, two or more control channel communications on the associated component carrier that are overlapping in the time domain. The communications manager 1720 may be configured as or otherwise support a means for demultiplexing the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications.

By including or configuring the communications manager 1720 in accordance with examples as described herein, the device 1705 may support techniques for multiplexing in uplink CA that provides for more efficient utilization of communication resources, reduced power consumption (e.g., by transmitting on fewer CCs in some instances), improved user experience related to reduced latency and reduced power consumption, and longer battery life.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of multiplexing techniques for multiple uplink component carriers as described herein, or the processor 1740 and the memory 1730 may be otherwise configured to perform or support such operations.

Figure 18:
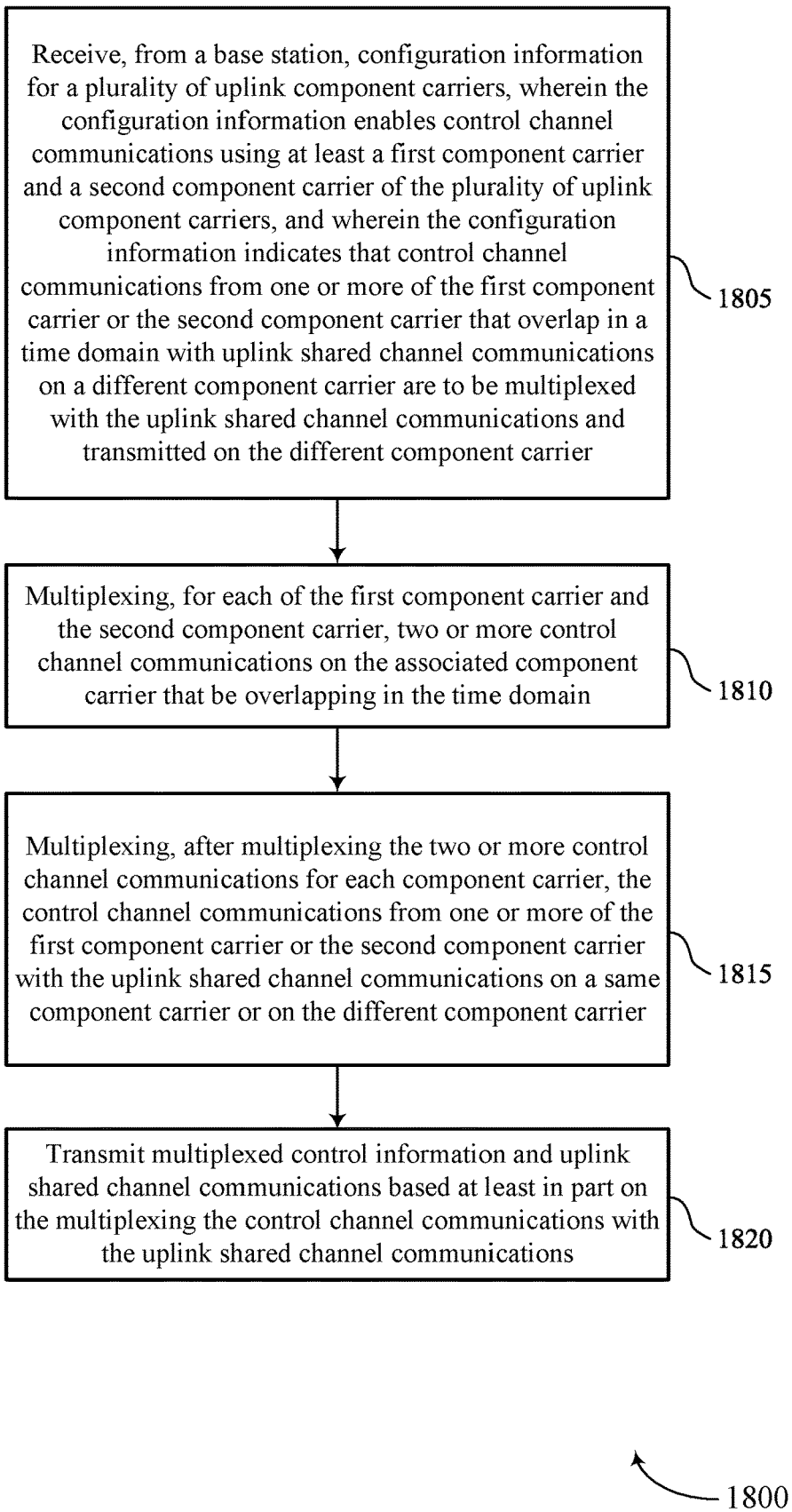
FIGS. 18 through 21 show flowcharts illustrating methods that support multiplexing techniques for multiple uplink component carriers in accordance with aspects of the present disclosure.

FIG. 18 shows a flowchart illustrating a method 1800 that supports multiplexing techniques for multiple uplink component carriers in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, configuration information for a set of multiple uplink component carriers, where the configuration information enables control channel communications using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The operations of 1805 may be performed in accordance with examples as disclosed herein. In some examples, aspects of the operations of 1805 may be performed by a configuration manager 1225 as described with reference to FIG. 12.

At 1810, the method may include multiplexing, for each of the first component carrier and the second component carrier, two or more control channel communications on the associated component carrier that are overlapping in the time domain. The operations of 1810 may be performed in accordance with examples as disclosed herein. In some examples, aspects of the operations of 1810 may be performed by a multiplexing manager 1230 as described with reference to FIG. 12.

At 1815, the method may include multiplexing, after multiplexing the two or more control channel communications for each component carrier, the control channel communications from one or more of the first component carrier or the second component carrier with the uplink shared channel communications on a same component carrier or on the different component carrier, where the multiplexing on the same component carrier or on the different component carrier is based on a configuration associated with concurrent shared channel and control channel communications. The operations of 1815 may be performed in accordance with examples as disclosed herein. In some examples, aspects of the operations of 1815 may be performed by a multiplexing manager 1230 as described with reference to FIG. 12.

At 1820, the method may include transmitting multiplexed control information and uplink shared channel communications based on the multiplexing the control channel communications with the uplink shared channel communications. The operations of 1820 may be performed in accordance with examples as disclosed herein. In some examples, aspects of the operations of 1820 may be performed by an uplink transmission manager 1235 as described with reference to FIG. 12.

Figure 19:
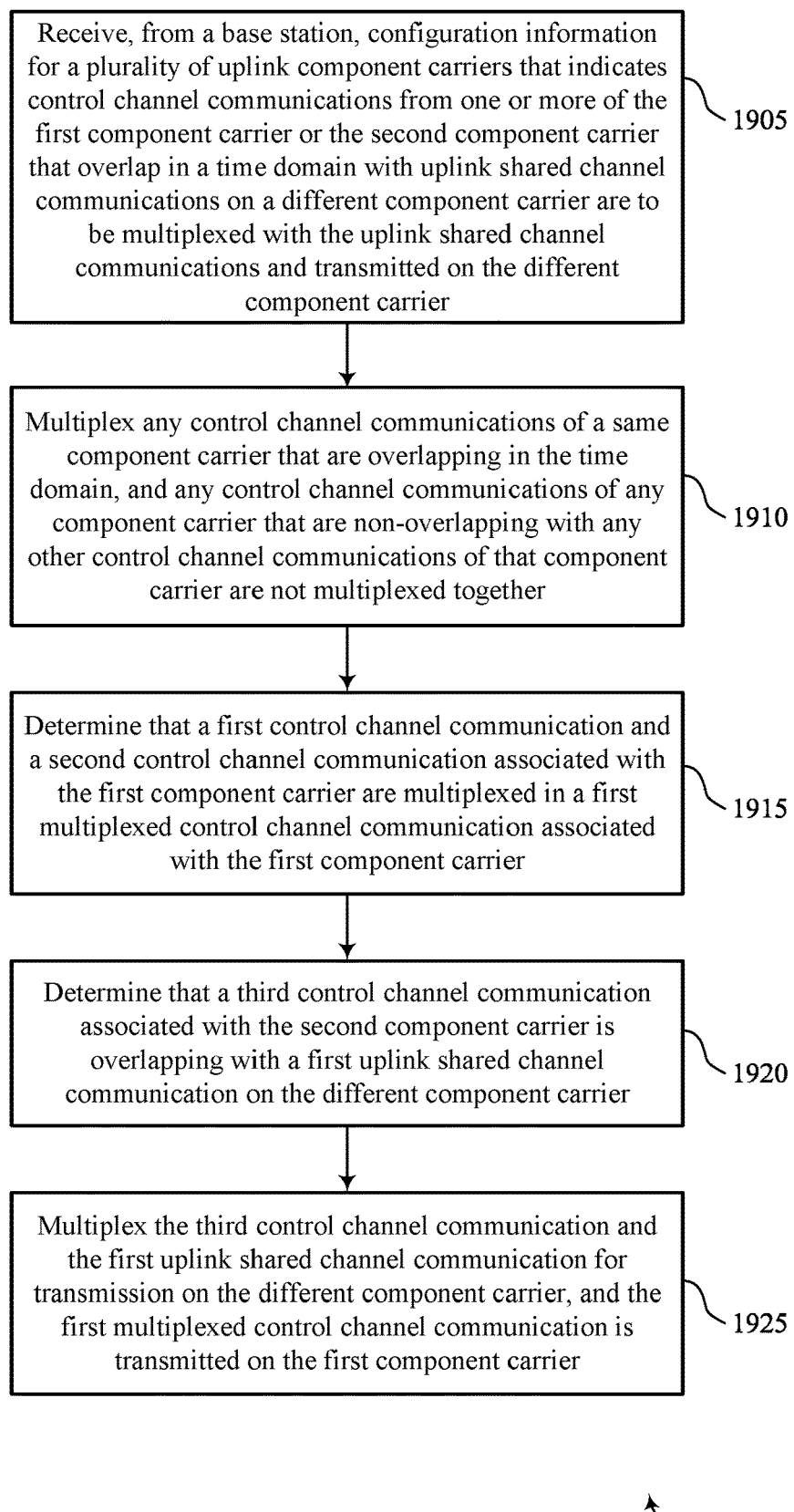

FIG. 19 shows a flowchart illustrating a method 1900 that supports multiplexing techniques for multiple uplink component carriers in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, configuration information for a plurality of uplink component carriers that indicates control channel communications from one or more of the first component carrier or the second component carrier that overlap in a time domain with uplink shared channel communications on a different component carrier are to be multiplexed with the uplink shared channel communications and transmitted on the different component carrier. The operations of 1905 may be performed in accordance with examples as disclosed herein. In some examples, aspects of the operations of 1905 may be performed by a configuration manager 1225 as described with reference to FIG. 12.

At 1910, the method may include multiplexing any control channel communications of a same component carrier that are overlapping in the time domain, and any control channel communications of any component carrier that are non-overlapping with any other control channel communications of that component carrier are not multiplexed together. The operations of 1910 may be performed in accordance with examples as disclosed herein. In some examples, aspects of the operations of 1910 may be performed by a multiplexing manager 1230 as described with reference to FIG. 12.

At 1915, the method may include determining that a first control channel communication and a second control channel communication associated with the first component carrier are multiplexed in a first multiplexed control channel communication associated with the first component carrier. The operations of 1915 may be performed in accordance with examples as disclosed herein. In some examples, aspects of the operations of 1915 may be performed by a multiplexing manager 1230 as described with reference to FIG. 12.

At 1920, the method may include determining that a third control channel communication associated with the second component carrier is overlapping with a first uplink shared channel communication on the different component carrier. The operations of 1920 may be performed in accordance with examples as disclosed herein. In some examples, aspects of the operations of 1920 may be performed by a multiplexing manager 1230 as described with reference to FIG. 12.

At 1925, the method may include multiplexing the third control channel communication and the first uplink shared channel communication for transmission on the different component carrier, and the first multiplexed control channel communication is transmitted on the first component carrier. The operations of 1925 may be performed in accordance with examples as disclosed herein. In some examples, aspects of the operations of 1925 may be performed by a multiplexing manager 1230 as described with reference to FIG. 12.

Figure 20:
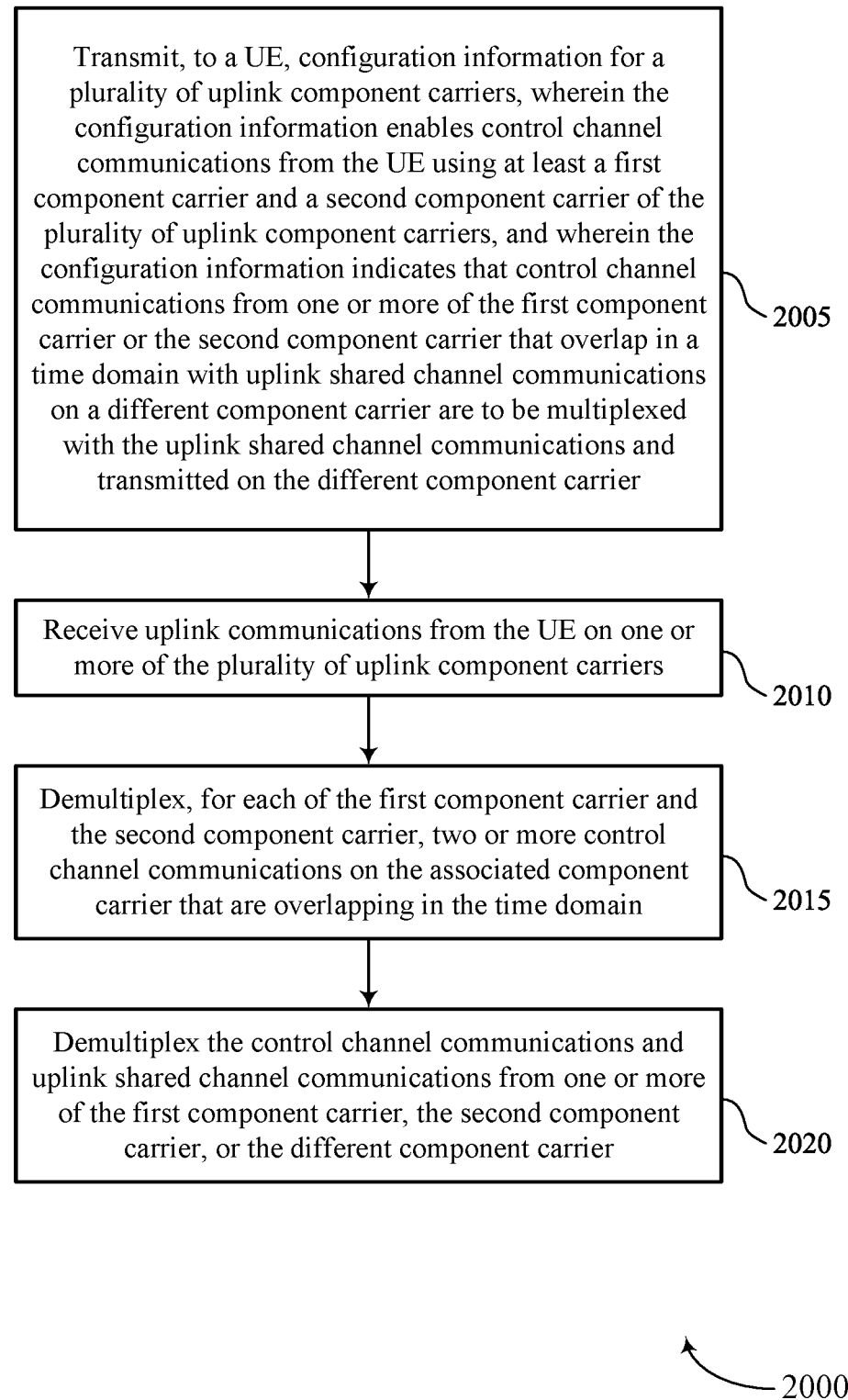

FIG. 20 shows a flowchart illustrating a method 2000 that supports multiplexing techniques for multiple uplink component carriers in accordance with aspects of the present disclosure. The operations of the method 2000 may be implemented by a base station or its components as described herein. For example, the operations of the method 2000 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, configuration information for a set of multiple uplink component carriers, where the configuration information enables control channel communications from the UE using at least a first component carrier and a second component carrier of the set of multiple uplink component carriers, and where the configuration information indicates that control channel communications from one or more of the first component carrier or the second component carrier that overlap in a time domain with uplink shared channel communications on a different component carrier are to be multiplexed with the uplink shared channel communications and transmitted on the different component carrier. The operations of 2005 may be performed in accordance with examples as disclosed herein. In some examples, aspects of the operations of 2005 may be performed by a configuration manager 1625 as described with reference to FIG. 16.

At 2010, the method may include receiving uplink communications from the UE on one or more of the set of multiple uplink component carriers. The operations of 2010 may be performed in accordance with examples as disclosed herein. In some examples, aspects of the operations of 2010 may be performed by an uplink transmission manager 1630 as described with reference to FIG. 16.

At 2015, the method may include demultiplexing, for each of the first component carrier and the second component carrier, two or more control channel communications on the associated component carrier that are overlapping in the time domain. The operations of 2015 may be performed in accordance with examples as disclosed herein. In some examples, aspects of the operations of 2015 may be performed by a multiplexing manager 1635 as described with reference to FIG. 16.

At 2020, the method may include demultiplexing the control channel communications and uplink shared channel communications from one or more of the first component carrier, the second component carrier, or the different component carrier, where the demultiplexing the first component carrier, the second component carrier, or the different component carrier is based on a configuration associated with concurrent shared channel and control channel communications. The operations of 2020 may be performed in accordance with examples as disclosed herein. In some examples, aspects of the operations of 2020 may be performed by a multiplexing manager 1635 as described with reference to FIG. 16.

Figure 21:
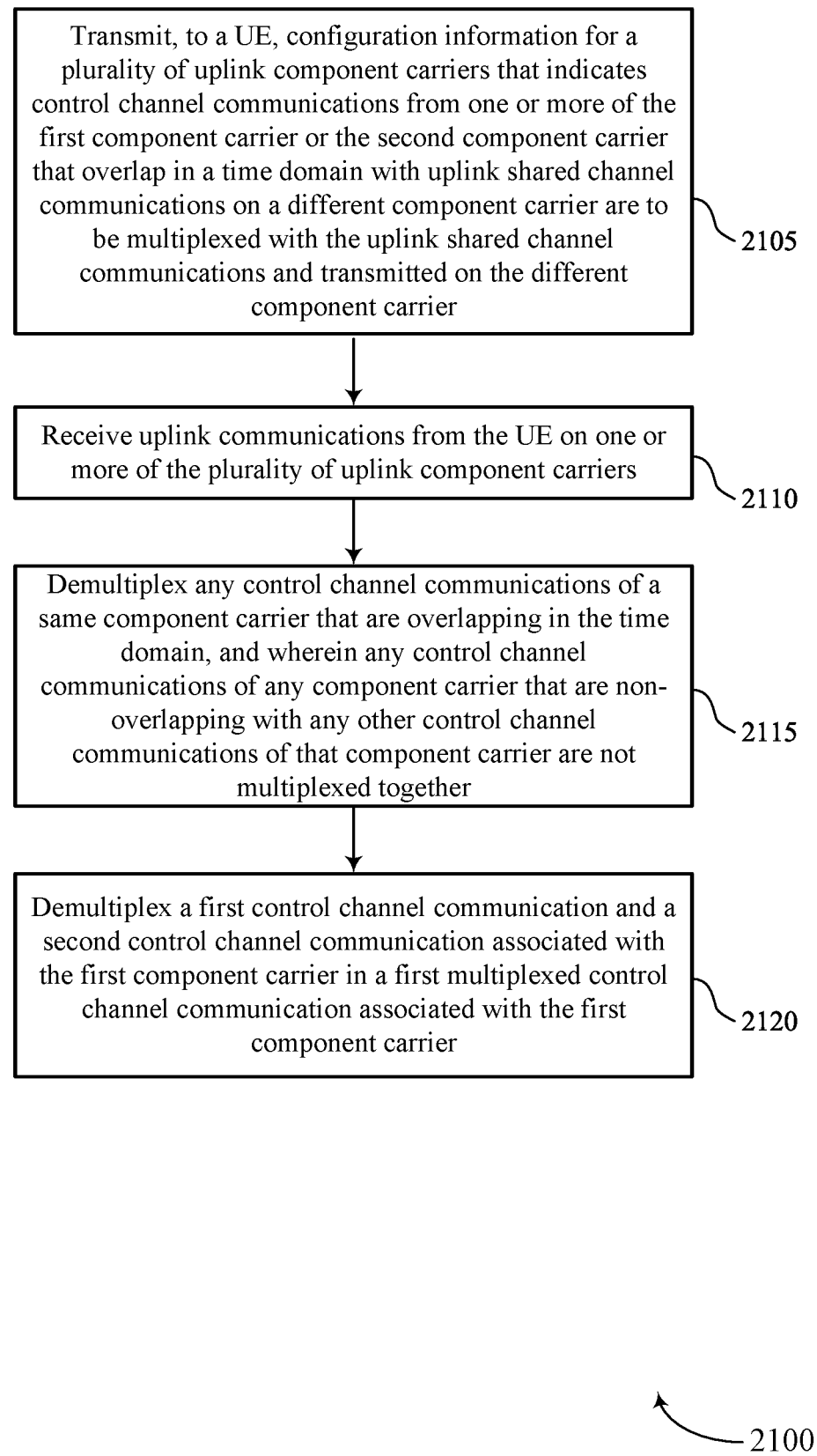

FIG. 21 shows a flowchart illustrating a method 2100 that supports multiplexing techniques for multiple uplink component carriers in accordance with aspects of the present disclosure. The operations of the method 2100 may be implemented by a base station or its components as described herein. For example, the operations of the method 2100 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, configuration information for a plurality of uplink component carriers that indicates control channel communications from one or more of the first component carrier or the second component carrier that overlap in a time domain with uplink shared channel communications on a different component carrier are to be multiplexed with the uplink shared channel communications and transmitted on the different component carrier. The operations of 2105 may be performed in accordance with examples as disclosed herein. In some examples, aspects of the operations of 2105 may be performed by a configuration manager 1625 as described with reference to FIG. 16.

At 2110, the method may include receiving uplink communications from the UE on one or more of the set of multiple uplink component carriers. The operations of 2110 may be performed in accordance with examples as disclosed herein. In some examples, aspects of the operations of 2110 may be performed by an uplink transmission manager 1630 as described with reference to FIG. 16.

At 2115, the method may include demultiplexing any control channel communications of a same component carrier that are overlapping in the time domain, and wherein any control channel communications of any component carrier that are non-overlapping with any other control channel communications of that component carrier are not multiplexed together. The operations of 2115 may be performed in accordance with examples as disclosed herein. In some examples, aspects of the operations of 2115 may be performed by a multiplexing manager 1635 as described with reference to FIG. 16.

At 2120, the method may include demultiplexing a first control channel communication and a second control channel communication associated with the first component carrier in a first multiplexed control channel communication associated with the first component carrier. The operations of 2120 may be performed in accordance with examples as disclosed herein. In some examples, aspects of the operations of 2120 may be performed by a multiplexing manager 1635 as described with reference to FIG. 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, configuration information for a plurality of uplink component carriers, wherein the configuration information enables control channel communications using at least a first component carrier and a second component carrier of the plurality of uplink component carriers, and wherein the configuration information indicates that control channel communications from one or more of the first component carrier or the second component carrier that overlap in a time domain with uplink shared channel communications on a different component carrier are to be multiplexed with the uplink shared channel communications and transmitted on the different component carrier; multiplexing, for each of the first component carrier and the second component carrier, two or more control channel communications on the associated component carrier that are overlapping in the time domain; multiplexing, after multiplexing the two or more control channel communications for each component carrier, the control channel communications from one or more of the first component carrier or the second component carrier with the uplink shared channel communications on a same component carrier or on the different component carrier, wherein the multiplexing on the same component carrier or on the different component carrier is based at least in part on a configuration associated with concurrent shared channel and control channel communications; and transmitting multiplexed control information and uplink shared channel communications based at least in part on the second multiplexing procedure.

Aspect 2: The method of aspect 1, wherein the multiplexing the two or more control channel communications for each component carrier comprises: multiplexing any control channel communications of a same component carrier that are overlapping in the time domain, and wherein any control channel communications of any component carrier that are non-overlapping with any other control channel communications of that component carrier are not multiplexed together.

Aspect 3: The method of any of aspects 1 through 2, wherein the multiplexing the control channel communications with the uplink shared channel communications comprises: determining that a first control channel communication and a second control channel communication associated with the first component carrier are multiplexed in a first multiplexed control channel communication associated with the first component carrier; determining that a third control channel communication associated with the second component carrier is overlapping in the time domain with a first uplink shared channel communication on the different component carrier; and multiplexing the third control channel communication and the first uplink shared channel communication for transmission on the different component carrier, and wherein the first multiplexed control channel communication is transmitted on the first component carrier when the first multiplexed control channel communication is not overlapping with the first uplink shared channel communication for transmission on the different component carrier.

Aspect 4: The method of aspect 3, wherein the third control channel communication associated with the second component carrier is treated as non-overlapping with both the first control channel communication and the second control channel communication irrespective of whether either of the first control channel communication or the second control channel communication are overlapping with the third control channel communication in the time domain.

Aspect 5: The method of any of aspects 1 through 4, wherein the control channel communications include channel state information, scheduling request information, acknowledgment/negative-acknowledgment feedback, or any combinations thereof.

Aspect 6: The method of any of aspects 1 through 5, wherein the multiplexing the control channel communications with the uplink shared channel communications is performed on a per-component carrier basis to multiplex the control channel communications and the uplink shared channel communications on a same component carrier, and wherein the transmitting comprises transmitting uplink communications concurrently on two or more component carriers of the plurality of uplink component carriers.

Aspect 7: The method of any of aspects 1 through 6, wherein the multiplexing the control channel communications with the uplink shared channel communications procedure is performed across component carriers to multiplex control channel communications of one or more of the first component carrier or the second component carrier with the uplink shared channel communications of the different component carrier based at least in part on the different component carrier being configured for control channel communications.

Aspect 8: The method of aspect 7, wherein a first subset of the plurality of uplink component carriers are configured to allow control channel communications or shared channel communications, and a second subset of the plurality of uplink component carriers are configured to allow uplink shared channel communications only, and wherein the multiplexing the control channel communications with the uplink shared channel communications is performed across component carriers only for the first subset of the plurality of uplink component carriers.

Aspect 9: The method of any of aspects 1 through 8, wherein the multiplexing the two or more control channel communications for each component carrier is based at least in part on a priority associated with each of the two or more control channel communications on the associated component carrier.

Aspect 10: The method of any of aspects 1 through 9, wherein the multiplexing the control channel communications with the uplink shared channel communications is based at least in part on a first priority associated with the control channel communications from one or more of the first component carrier or the second component carrier and a second priority associated with the uplink shared channel communications.

Aspect 11: The method of any of aspects 1 through 10, wherein the multiplexing the control channel communications with the uplink shared channel communications is performed on across component carriers to multiplex control channel communications of one or more of the first component carrier or the second component carrier with the uplink shared channel communications of the different component carrier based at least in part on the different component carrier being configured to allow control channel communications and further based at least in part on a priority associated with the control channel communications and the uplink shared channel communications.

Aspect 12: The method of aspect 11, wherein two or more control channel communications having different priorities are multiplexed together for transmission.

Aspect 13: A method for wireless communication at a base station, comprising: transmitting, to a UE, configuration information for a plurality of uplink component carriers, wherein the configuration information enables control channel communications from the UE using at least a first component carrier and a second component carrier of the plurality of uplink component carriers, and wherein the configuration information indicates that control channel communications from one or more of the first component carrier or the second component carrier that overlap in a time domain with uplink shared channel communications on a different component carrier are to be multiplexed with the uplink shared channel communications and transmitted on the different component carrier; receiving uplink communications from the UE on one or more of the plurality of uplink component carriers; demultiplexing, for each of the first component carrier and the second component carrier, two or more control channel communications on the associated component carrier that are overlapping in the time domain; and demultiplexing the control channel communications and uplink shared channel communications from one or more of the first component carrier, the second component carrier, or the different component carrier, wherein the demultiplexing the first component carrier, the second component carrier, or the different component carrier is based at least in part on a configuration associated with concurrent shared channel and control channel communications.

Aspect 14: The method of aspect 13, wherein the demultiplexing the two or more control channel communications comprises: demultiplexing any control channel communications of a same component carrier that are overlapping in the time domain, and wherein any control channel communications of any component carrier that are non-overlapping with any other control channel communications of that component carrier are not multiplexed together.

Aspect 15: The method of any of aspects 13 through 14, wherein demultiplexing a first control channel communication and a second control channel communication associated with the first component carrier in a first multiplexed control channel communication associated with the first component carrier, and wherein the demultiplexing the control channel communications and uplink shared channel communications is performed on an uplink communication on the different component carrier to demultiplex a third control channel communication associated with the second component carrier that is overlapping in the time domain with a first uplink shared channel communication on the different component carrier when the first multiplexed control channel communication is not overlapping with the first uplink shared channel communication for transmission.

Aspect 16: The method of aspect 15, wherein the third control channel communication associated with the second component carrier is treated as non-overlapping with both the first control channel communication and the second control channel communication irrespective of whether either of the first control channel communication or the second control channel communication are overlapping with the third control channel communication in the time domain.

Aspect 17: The method of any of aspects 13 through 16, wherein the control channel communications include channel state information, scheduling request information, acknowledgment/negative-acknowledgment feedback, or any combinations thereof.

Aspect 18: The method of any of aspects 13 through 17, wherein the demultiplexing the control channel communications and uplink shared channel communications is performed on a per-component carrier basis to demultiplex the control channel communications and the uplink shared channel communications on a same component carrier, and wherein the receiving comprises receiving the uplink communications concurrently on two or more component carriers of the plurality of uplink component carriers.

Aspect 19: The method of any of aspects 13 through 18, wherein the demultiplexing the control channel communications and uplink shared channel communications is performed across component carriers to demultiplex control channel communications of one or more of the first component carrier or the second component carrier and the uplink shared channel communications of the different component carrier based at least in part on the different component carrier being configured to allow control channel communications, and wherein the receiving comprises receiving the uplink communications concurrently on the different component carrier and one or more of the first component carrier or the second component carrier.

Aspect 20: The method of aspect 19, wherein a first subset of the plurality of uplink component carriers are configured to allow control channel communications or shared channel communications and a second subset of the plurality of uplink component carriers are configured to allow uplink shared channel communications only.

Aspect 21: The method of any of aspects 13 through 20, wherein the demultiplexing the two or more control channel communications is based at least in part on a priority associated with each of the two or more control channel communications on the associated component carrier.

Aspect 22: The method of any of aspects 13 through 21, wherein the demultiplexing the control channel communications and uplink shared channel communications is based at least in part on a first priority associated with the control channel communications from one or more of the first component carrier or the second component carrier and a second priority associated with the uplink shared channel communications.

Aspect 23: The method of any of aspects 13 through 22, wherein the demultiplexing the control channel communications and uplink shared channel communications is performed across component carriers to demultiplex control channel communications of one or more of the first component carrier or the second component carrier with the uplink shared channel communications of the different component carrier based at least in part on the different component carrier being configured to allow control channel communications and further based at least in part on a priority associated with the control channel communications and the uplink shared channel communications.

Aspect 24: The method of aspect 23, wherein two or more control channel communications having different priorities are multiplexed together at the UE for transmission.

Aspect 25: An apparatus for wireless communication at a UE, comprising a processor; and memory coupled with the processor, the memory and processor configured to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; and memory coupled with the processor, the memory and processor configured to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
    a memory; and
    at least one processor coupled to the memory, wherein the at least one processor is configured to:
        receive, from a second network node, configuration information for a plurality of uplink component carriers, wherein the configuration information enables uplink control channel communications using at least a first component carrier and a second component carrier of the plurality of uplink component carriers, and wherein the configuration information indicates whether uplink control channel communications from one or more of the first component carrier or the second component carrier that overlap in a time domain with uplink shared channel communications on a different component carrier are to be multiplexed with the uplink shared channel communications and transmitted on the different component carrier;
        multiplex, for each of the first component carrier and the second component carrier, two or more uplink control channel communications on the associated component carrier that are overlapping in the time domain;
        multiplex, after the two or more uplink control channel communications for each component carrier are multiplexed, the uplink control channel communications from one or more of the first component carrier or the second component carrier with the uplink shared channel communications on a same component carrier or on the different component carrier, wherein whether the uplink control channel communications are multiplexed with the uplink shared channel communications on the same component carrier or on the different component carrier is based at least in part on a configuration associated with concurrent shared channel and control channel communications; and
        transmit multiplexed uplink control information and uplink shared channel communications based at least in part on the multiplexing of the uplink control channel communications with the uplink shared channel communications.

2. The first network node of claim 1, wherein, to multiplex the two or more uplink control channel communications for each component carrier, the at least one processor is configured to:
    multiplex any uplink control channel communications of a same component carrier that are overlapping in the time domain, and wherein any uplink control channel communications of any component carrier that are non-overlapping with any other uplink control channel communications of that component carrier are not multiplexed together.

3. The first network node of claim 1, wherein, to multiplex the uplink control channel communications with the uplink shared channel communications, the at least one processor is configured to:
    determine that a first uplink control channel communication and a second uplink control channel communication associated with the first component carrier are multiplexed in a first multiplexed uplink control channel communication associated with the first component carrier;
    determine that a third uplink control channel communication associated with the second component carrier is overlapping in the time domain with a first uplink shared channel communication on the different component carrier; and
    multiplex the third uplink control channel communication and the first uplink shared channel communication for transmission on the different component carrier, and wherein the first multiplexed uplink control channel communication is transmitted on the first component carrier when the first multiplexed uplink control channel communication is not overlapping with the first uplink shared channel communication for transmission on the different component carrier.

4. The first network node of claim 3, wherein the third uplink control channel communication associated with the second component carrier is treated as non-overlapping with both the first uplink control channel communication and the second uplink control channel communication irrespective of whether either of the first uplink control channel communication or the second uplink control channel communication are overlapping with the third uplink control channel communication in the time domain.

5. The first network node of claim 1, wherein the uplink control channel communications include channel state information, scheduling request information, acknowledgment/negative-acknowledgment feedback, or any combinations thereof.

6. The first network node of claim 1, wherein the multiplexing of the uplink control channel communications with the uplink shared channel communications is performed on a per-component carrier basis to multiplex the uplink control channel communications and the uplink shared channel communications on a same component carrier, and wherein transmission of the multiplexed uplink control information and uplink shared channel communications includes transmission of uplink communications concurrently on two or more component carriers of the plurality of uplink component carriers.

7. The first network node of claim 1, wherein the multiplexing of the uplink control channel communications with the uplink shared channel communications is performed across component carriers to multiplex uplink control channel communications of one or more of the first component carrier or the second component carrier with the uplink shared channel communications of the different component carrier based at least in part on the different component carrier being configured for uplink control channel communications.

8. The first network node of claim 7, wherein a first subset of the plurality of uplink component carriers are configured to allow uplink control channel communications or uplink shared channel communications, and a second subset of the plurality of uplink component carriers are configured to allow uplink shared channel communications only, and wherein the multiplexing of the uplink control channel communications with the uplink shared channel communications is performed across component carriers only for the first subset of the plurality of uplink component carriers.

9. The first network node of claim 1, wherein the multiplexing of the two or more uplink control channel communications for each component carrier is based at least in part on a priority associated with each of the two or more uplink control channel communications on the associated component carrier.

10. The first network node of claim 1, wherein the multiplexing of the uplink control channel communications with the uplink shared channel communications is based at least in part on a first priority associated with the uplink control channel communications from one or more of the first component carrier or the second component carrier and a second priority associated with the uplink shared channel communications.

11. The first network node of claim 1, wherein the multiplexing of the uplink control channel communications with the uplink shared channel communications is performed across component carriers to multiplex uplink control channel communications of one or more of the first component carrier or the second component carrier with the uplink shared channel communications of the different component carrier based at least in part on the different component carrier being configured to allow uplink control channel communications and further based at least in part on a priority associated with the uplink control channel communications and the uplink shared channel communications.

12. The first network node of claim 11, wherein two or more uplink control channel communications having different priorities are multiplexed together for transmission.

13. A first network node for wireless communication, comprising:
a memory; and
at least one processor coupled to the memory, wherein the at least one processor is configured to:
transmit, to a second network node, configuration information for a plurality of uplink component carriers, wherein the configuration information enables uplink control channel communications from the second network node using at least a first component carrier and a second component carrier of the plurality of uplink component carriers, and wherein the configuration information indicates whether uplink control channel communications from one or more of the first component carrier or the second component carrier that overlap in a time domain with uplink shared channel communications on a different component carrier are to be multiplexed with the uplink shared channel communications and transmitted on the different component carrier;
receive uplink communications from the second network node on one or more of the plurality of uplink component carriers;
demultiplex, for each of the first component carrier and the second component carrier, two or more uplink control channel communications on the associated component carrier that are overlapping in the time domain; and
demultiplex the uplink control channel communications and uplink shared channel communications from one or more of the first component carrier, the second component carrier, or the different component carrier, wherein the demultiplexing of the first component carrier, the second component carrier, or the different component carrier is based at least in part on a configuration associated with concurrent shared channel and control channel communications.

14. The first network node of claim 13, wherein, to demultiplex the two or more uplink control channel communications, the at least one processor is configured to:
demultiplex any uplink control channel communications of a same component carrier that are overlapping in the time domain, and wherein any uplink control channel communications of any component carrier that are non-overlapping with any uplink other control channel communications of that component carrier are not multiplexed together.

15. The first network node of claim 13, wherein the at least one processor is further configured to:
demultiplex a first uplink control channel communication and a second uplink control channel communication associated with the first component carrier in a first multiplexed uplink control channel communication associated with the first component carrier, and wherein the demultiplexing of the uplink control channel communications and uplink shared channel communications is performed on an uplink communication on the different component carrier to demultiplex a third uplink control channel communication associated with the second component carrier that is overlapping in the time domain with a first uplink shared channel communication on the different component carrier when the first multiplexed uplink control channel communication is not overlapping with the first uplink shared channel communication.

16. The first network node of claim 15, wherein the third uplink control channel communication associated with the second component carrier is treated as non-overlapping with both the first uplink control channel communication and the second uplink control channel communication irrespective of whether either of the first uplink control channel communication or the second uplink control channel communication are overlapping with the third uplink control channel communication in the time domain.

17. The first network node of claim 13, wherein the uplink control channel communications include channel state information, scheduling request information, acknowledgment/negative-acknowledgment feedback, or any combinations thereof.

18. The first network node of claim 13, wherein the demultiplexing of the uplink control channel communications and uplink shared channel communications is performed on a per-component carrier basis to demultiplex the uplink control channel communications and the uplink shared channel communications on a same component carrier, and wherein the receiving comprises receiving the uplink communications concurrently on two or more component carriers of the plurality of uplink component carriers.

19. The first network node of claim 13, wherein the demultiplexing of the uplink control channel communications and uplink shared channel communications is performed across component carriers to demultiplex uplink control channel communications of one or more of the first component carrier or the second component carrier and the uplink shared channel communications of the different component carrier based at least in part on the different component carrier being configured to allow uplink control channel communications, and wherein reception of the uplink communications includes concurrent reception of the uplink communications on the different component carrier and one or more of the first component carrier or the second component carrier.

20. The first network node of claim 19, wherein a first subset of the plurality of uplink component carriers are configured to allow uplink control channel communications or shared channel communications and a second subset of the plurality of uplink component carriers are configured to allow uplink shared channel communications only.

21. The first network node of claim 13, wherein the demultiplexing of the two or more uplink control channel communications is based at least in part on a priority associated with each of the two or more uplink control channel communications on the associated component carrier.

22. The first network node of claim 13, wherein the demultiplexing of the uplink control channel communications and uplink shared channel communications is based at least in part on a first priority associated with the uplink control channel communications from one or more of the first component carrier or the second component carrier and a second priority associated with the uplink shared channel communications.

23. The first network node of claim 13, wherein the demultiplexing of the uplink control channel communications and uplink shared channel communications is performed across component carriers to demultiplex uplink control channel communications of one or more of the first component carrier or the second component carrier with the uplink shared channel communications of the different component carrier based at least in part on the different component carrier being configured to allow uplink control channel communications and further based at least in part on a priority associated with the uplink control channel communications and the uplink shared channel communications.

24. The first network node of claim 23, wherein two or more uplink control channel communications having different priorities are multiplexed together at the second network node for transmission.

25. A method of wireless communication performed by a first network node, comprising:
receiving, from a second network node, configuration information for a plurality of uplink component carriers, wherein the configuration information enables uplink control channel communications using at least a first component carrier and a second component carrier of the plurality of uplink component carriers, and wherein the configuration information indicates whether uplink control channel communications from one or more of the first component carrier or the second component carrier that overlap in a time domain with uplink shared channel communications on a different component carrier are to be multiplexed with the uplink shared channel communications and transmitted on the different component carrier;
multiplexing, for each of the first component carrier and the second component carrier, two or more uplink control channel communications on the associated component carrier that be overlapping in the time domain;
multiplexing, after multiplexing the two or more uplink control channel communications for each component carrier, the uplink control channel communications from one or more of the first component carrier or the second component carrier with the uplink shared channel communications on a same component carrier or on the different component carrier, wherein multiplexing on the same component carrier or on the different component carrier is based at least in part on a configuration associated with concurrent shared channel and control channel communications; and
transmitting multiplexed uplink control information and uplink shared channel communications based at least in part on multiplexing the uplink control channel communications with the uplink shared channel communications.

26. The method of claim 25, wherein multiplexing the two or more uplink control channel communications for each component carrier comprises:
multiplexing any uplink control channel communications of a same component carrier that are overlapping in the time domain, and wherein any uplink control channel communications of any component carrier that are non-overlapping with any other uplink control channel communications of that component carrier are not multiplexed together.

27. The method of claim 26, wherein multiplexing the uplink control channel communications with the uplink shared channel communications comprises:
determining that a first uplink control channel communication and a second uplink control channel communication associated with the first component carrier are multiplexed in a first multiplexed uplink control channel communication associated with the first component carrier;
determining that a third uplink control channel communication associated with the second component carrier is overlapping in the time domain with a first uplink shared channel communication on the different component carrier; and
multiplexing the third uplink control channel communication and the first uplink shared channel communication for transmission on the different component carrier, and wherein the first multiplexed uplink control channel communication is transmitted on the first component carrier.

28. A method for wireless communication performed by a first network node, comprising:
transmitting, to a second network node, configuration information for a plurality of uplink component carriers, wherein the configuration information enables uplink control channel communications from the second network node using at least a first component carrier and a second component carrier of the plurality of uplink component carriers, and wherein the configuration information indicates whether uplink control channel communications from one or more of the first component carrier or the second component carrier that overlap in a time domain with uplink shared channel communications on a different component carrier are to be multiplexed with the uplink shared channel communications and transmitted on the different component carrier;
receiving uplink communications from the second network node on one or more of the plurality of uplink component carriers;
demultiplexing, for each of the first component carrier and the second component carrier, two or more uplink control channel communications on the associated component carrier that are overlapping in the time domain; and
demultiplexing the uplink control channel communications and uplink shared channel communications from one or more of the first component carrier, the second component carrier, or the different component carrier, wherein demultiplexing the first component carrier, the second component carrier, or the different component carrier is based at least in part on a configuration associated with concurrent shared channel and control channel communications.

29. The method of claim 28, wherein demultiplexing the two or more uplink control channel communications comprises:
demultiplexing any uplink control channel communications of a same component carrier that are overlapping in the time domain, and wherein any uplink control channel communications of any component carrier that are non-overlapping with any other uplink control channel communications of that component carrier are not multiplexed together.

30. The method of claim 29, further comprising:
demultiplexing a first uplink control channel communication and an uplink second control channel communication associated with the first component carrier in a first multiplexed uplink control channel communication associated with the first component carrier, and wherein the demultiplex the uplink control channel communications and uplink shared channel communications is performed on an uplink communication on the different component carrier to demultiplex a third uplink control channel communication associated with the second component carrier that is overlapping in the time domain with a first uplink shared channel communication on the different component carrier.

* * * * *